United States Patent [19]
Sander et al.

[11] Patent Number: 5,350,785
[45] Date of Patent: Sep. 27, 1994

[54] STABILISED CHLORINE-CONTAINING POLYMER COMPOSITIONS

[75] Inventors: Hans J. Sander, Lorsch; Olaf-René Hartmann, Bensheim; Hermann O. Wirth, Bensheim; Wolfgang Wehner, Zwingenberg, all of Fed. Rep. of Germany

[73] Assignee: Ciba-Geigy Corporation, Ardsley, N.Y.

[21] Appl. No.: 58,853

[22] Filed: May 6, 1993

[30] Foreign Application Priority Data

May 13, 1992 [CH] Switzerland .................. 1536/92

[51] Int. Cl.⁵ ................................. C08K 5/3435
[52] U.S. Cl. ....................... 524/100; 524/101; 524/357; 524/400; 524/450
[58] Field of Search ............. 524/100, 101, 357, 450

[56] References Cited

U.S. PATENT DOCUMENTS

| | | | |
|---|---|---|---|
| 4,000,100 | 12/1976 | Baldyga | 260/23 |
| 4,086,204 | 4/1978 | Cassandrini et al. | 524/101 |
| 4,459,395 | 7/1984 | Cantatore | 524/100 |
| 4,590,233 | 5/1986 | Erwied et al. | 524/357 |
| 4,822,833 | 4/1989 | Zappia et al. | 524/100 |
| 5,106,898 | 4/1992 | Nosu et al. | 524/436 |
| 5,134,181 | 7/1992 | Masina | 524/100 |
| 5,141,980 | 8/1992 | Ranceze et al. | 524/436 |
| 5,216,058 | 6/1993 | Visneski | 524/450 |

FOREIGN PATENT DOCUMENTS

0421933 4/1991 European Pat. Off.
0488950 6/1992 European Pat. Off.

OTHER PUBLICATIONS

C.A. 119(14):140497t.

*Primary Examiner*—Veronica P. Hoke
*Attorney, Agent, or Firm*—Luther A. R. Hall

[57] ABSTRACT

Stabilized chlorine-containing polymer compositions comprising a chlorine-containing polymer and a stabilizer mixture comprising:

a) at least one cyclic or non-cyclic, sterically hindered amine, b) at least one organic zinc compound and/or inorganic zinc compound from the series consisting of carbonates, chlorides, sulfates, oxides, hydroxides, basic oxides and mixed oxides, and c) at least one compound from the series consisting of the crystalline alkali metal/alkaline earth metal aluminosilicates, and, if desired, d) at least one 1,3-diketone and/or e) at least one organic or inorganic calcium compound.

Polymer compositions of this type are preferably employed for slush mould and crash pad applications.

24 Claims, No Drawings

STABILISED CHLORINE-CONTAINING POLYMER COMPOSITIONS

The invention relates to novel chlorine-containing polymer compositions, and to the use of the polymer compositions.

U.S. Pat. No. 4,822,833 discloses stabilised rigid PVC compositions which contain at least one 2,2,6,6-tetraalkylpiperidine light stabiliser and at least one organotin stabiliser.

U.S. Pat. No. 4,590,233 discloses a stabiliser composition for halogen-containing polymers which comprises β-diketones and a zeolite.

The known stabilisers and stabiliser mixtures are unable to satisfy all the requirements made of them in the polymers.

It has now been found that the chlorine-containing polymer compositions stabilised in accordance with the present invention have further improved properties with respect to thermal and light stability.

This is achieved according to the invention by means of a plasticised or unplasticised polymer composition comprising a chlorine-containing polymer and a stabiliser mixture comprising:

a) at least one cyclic or non-cyclic, sterically hindered amine, b) at least one organic zinc compound and/or inorganic zinc compound from the series consisting of carbonates, chlorides, sulfates, oxides, hydroxides, basic oxides and mixed oxides, and c) at least one compound from the series consisting of the crystalline alkali metal/alkaline earth metal aluminosilicates.

The polymer compositions according to the invention may contain further components.

Thus, the polymer composition may contain, as a further stabiliser, d) at least one 1,3-diketone.

The polymer composition may contain, as a further stabiliser, e) at least one organic or inorganic calcium compound.

The present invention accordingly also covers, for example, polymer compositions as described above wherein one or both of components d) and e) are present in the stabiliser mixture. Accordingly, the present invention covers polymer compositions in which the stabiliser mixture comprises components a), b) and c) or, for example, a), b), c) and d) or a), b), c) and e) or a), b), c), d) and e).

Expedient polymer compositions are those as described above in which, in the stabiliser mixture, a) is at least one cyclic, sterically hindered amine, in particular a compound from the series consisting of derivatives of polyalkylpiperidines which contain at least one group of the formula III

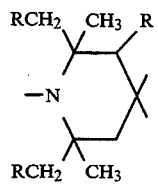

(III)

in which R is hydrogen or methyl; the polyalkylpiperidine groups of the formula III are preferably 4-substituted by one or two polar substituents or by a polar spiro ring system.

Expedient polymer compositions are those as described above in which b) is at least one organo zinc compound from the series consisting of aliphatic saturated $C_2$–$C_{22}$carboxylates, aliphatic olefinic $C_3$–$C_{22}$carboxylates, aliphatic $C_2$–$C_{22}$carboxylates which are substituted by at least one OH group, cyclic and bicyclic carboxylates having 5–22 carbon atoms, aromatic $C_7$–$C_{22}$carboxylates, aromatic $C_7$–$C_{22}$carboxylates which are substituted by at least one OH group, $C_1$–$C_{16}$alkyl-substituted phenylcarboxylates, phenyl-$C_1$–$C_{16}$alkyl carboxylates, $C_6$–$C_{18}$phenolates, $C_5$–$C_{26}$chelates of 1,3-diketones or β-ketocarboxylic esters or dehydroacetic acid derivatives, and mercaptides based on mercaptocarboxylic esters and glycinates.

Expedient polymer compositions are those as described above in which c) is at least one compound from the series consisting of the zeolites.

Zeolites can be described by the general formula (X)

(X)

in which n is the charge on the cation M,

M is an element from the first or second main group, y:x is a number between 0.8 and 15, in particular between 0.8 and 1.2, and w is a number between 0 and 300, in particular between 0.5 and 10.

Furthermore, zeolites which can be used according to the invention are disclosed in "Atlas of Zeolite Structure Types", W. M. Meier and D. H. Olson, Butterworths, 2nd Edition, 1986.

The preferred zeolites, known per se, of the NaA type which have a mean effective pore diameter of 4 Å, and are thus also known as zeolite 4A, can be prepared by known methods.

Suitable synthetic methods are described, inter alia, in DE-A 2 412 837. Further details on the properties and preparation of these sodium alumosilicates are given, for example, in the following references: DE-A 2 651 485, DE-A 2 651 445, DE-A 2 651 436, DE-A 2 651 419, DE-A 2 651 420, DE-A 2 651 437 and U.S. Pat. No. 3,112,176.

During the preparation, amorphous, finely divided sodium alumosilicates produced by precipitation can be converted into the crystalline state by heating to from 50° to 200° C. The crystalline sodium alumosilicate is then separated by filtration from the aqueous solution which remains and is dried, generally at from 50° to 200° C., until it has a water content of from 13 to 25 percent by weight. The crystalline products employed according to the invention and described, for example, in DE-A 2 412 837 have, in particular, a particle size in the range from 0.1 to 50 μm. The process according to the invention is preferably carried out using sodium alumosilicates having a particle size of from 0.1 to 20 μm. The calcium binding capacity of the sodium alumosilicates, determined at 22° C., is at least 50 mg of CaO/g of anhydrous active substance and can achieve values of about 200 mg of CaO/g of active substance. This calcium binding capacity is preferably in the range from 100 to 200 mg of CaO/g of active substance and is usually in the range above 150 mg of CaO/g. Details on the determination of the calcium binding capacity are given in DE-A 2 412 837 mentioned above and in the description below on the preparation of suitable sodium alumosilicates.

Particular preference is given to crystalline sodium alumosilicates whose particle size is, at least very substantially, in the range from 1 to 10 μm.

In a preferred embodiment of the invention, it is also possible to use sodium alumosilicates having rounded corners and edges. Zeolites of this type are advantageously prepared from a batch whose molar composition is in the range 2.5–6.0 $Na_2O.Al_2O_3:0.5–5.0\ SiO_2.60–200\ H_2O$.

This batch is crystallised in a conventional manner. This is advantageously achieved by warming the batch at 70°–120° C., preferably 80°–95° C., with stirring for at least ½ hour. The crystalline product is, in a simple manner, separated off, washed and then dried.

It is also possible to use, according to the invention, finely divided water-insoluble sodium alumosilicates which have been precipitated in the presence of water-soluble, inorganic or organic dispersants and crystallised. Suitable water-soluble organic dispersants are surfactants, non-surfactant aromatic sulfonic acids and compounds having a complexing capacity for calcium. Said dispersants can be introduced into the reaction mixture in any desired manner before or during the precipitation; they can, for example, be introduced as a solution before the precipitation or dissolved in the aluminate and/or silicate solution. The amount of dispersant should be at least 0.05 per cent by weight, preferably 0.1–5 percent by weight, based on the entire precipitation batch. For crystallisation, the precipitated product is heated at from 50° to 200° C. for ½ to 24 hours. From the large number of dispersants which can be used, examples which may be mentioned are sodium lauryl ether sulfate, sodium polyacrylate and the sodium salts of 1-hydroxyethane-1,1-diphosphonic acid.

The alkali metal/alkaline earth metal alumosilicates which are suitable according to the invention contain, for example, from 13 to 25 percent by weight of bound water; preferred products are those whose water content is in the range from 18 to 25 percent by weight.

Expedient polymer compositions are those as described above in which d) is at least one 1,3-diketone of the formula II or IIa,

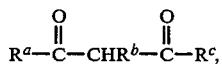  (II)

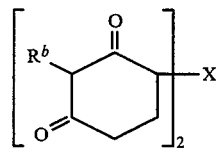  (IIa)

where $R^a$ is alkyl having 1 to 22 carbon atoms, $C_5$–$C_{10}$hydroxyalkyl, alkenyl having 2 to 22 carbon atoms, phenyl, phenyl which is substituted by 1 to 3 groups in the series consisting of —OH, $C_1$–$C_4$alkyl, $C_1$–$C_4$alkoxy and halogen, or is phenyl-$C_1$-$C_4$alkyl, a group of the formula

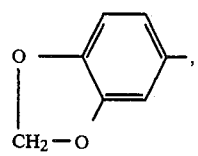

cycloalkyl having 5 to 12 ring carbon atoms, or cycloalkyl having 5 to 12 ring carbon atoms which is substituted by 1 or 3 $C_1$–$C_4$alkyl groups, $R^c$ is alkyl having 1 to 22 carbon atoms, $C_5$–$C_{10}$hydroxyalkyl, alkenyl having 2 to 22 carbon atoms, phenyl, phenyl which is substituted by 1 to 3 groups in the series consisting of —OH, $C_1$–$C_4$alkyl, $C_1$–$C_4$alkoxy and halogen, or is phenyl-$C_1$-$C_4$alkyl, a group of the formula

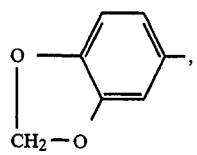

cycloalkyl having 5 to 12 ring carbon atoms, or cycloalkyl having 5 to 12 ring carbon atoms which is substituted by 1 or 3 $C_1$–$C_4$alkyl groups, $R^b$ is —H, alkyl having 1 to 18 carbon atoms, alkenyl having 2 to 12 carbon atoms, phenyl, $C_1$–$C_4$alkyl-substituted phenyl, phenyl-$C_1$-$C_4$alkyl, or a group of the formula

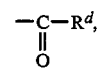

where $R^d$ is —$CH_3$, —$C_2H_5$ or phenyl, or in which $R^a$ and $R^b$ together are a tetramethylene radical or a tetramethylene radical which is fused to a benzene radical, or $R^a$ and $R^c$ together are a tetramethylene radical or a tetramethylene radical which is substituted by 1 to 3 $C_1$–$C_4$alkyl groups, and X is alkylene having 1–4 carbon atoms.

$R^a$ and $R^c$ as alkyl having 1 to 22 carbon atoms may be, for example, methyl, ethyl, propyl, n-butyl, tert-butyl, pentyl, hexyl, 2-ethylhexyl, nonyl, decyl, undecyl, dodecyl, tridecyl, octadecyl or eicosyl, and $R^b$ as alkyl having 1 to 18 carbon atoms may be, for example, as defined above, apart from eicosyl.

Examples of $C_5$–$C_{10}$hydroxyalkyl $R^a$ and $R^c$ are 5-hydroxypentyl, 6-hydroxyethyl and 7-hydroxyheptyl.

Examples of $R^a$ and $R^c$ as alkenyl having 2 to 22 carbon atoms are vinyl, propenyl, allyl, butenyl, methallyl, hexenyl, decenyl and heptadecenyl. Corresponding examples of $R^b$ as alkenyl having 2 to 12 carbon atoms can be taken correspondingly from the above list.

The phenyl groups which are preferably substituted by one to three groups from the series consisting of —OH, $C_1$–$C_4$alkyl, $C_1$–$C_4$alkoxy and halogen, as mentioned for $R^a$ and $R^c$, may be 4-hydroxyphenyl, 4-hydroxy-3,5-di-$C_1$–$C_4$alkylphenyl where $C_1$–$C_4$alkyl is, for example methyl or t-butyl, or methylphenyl, dimethylphenyl, ethylphenyl, n-butylphenyl, tert-butylphenyl, methyl-tert-butylphenyl, di-tert-butylphenyl, methoxy, ethoxyphenyl or monochlorophenyl.

$C_1$–$C_4$alkyl-substituted phenyl $R^b$ is thus, for example, methylphenyl, ethylphenyl or tert-butylphenyl.

Phenyl-$C_1$-$C_4$alkyl $R^a$, $R^b$ and $R^c$ are, for example, benzyl or methylbenzyl.

$R^a$ and $R^c$ may also be cycloalkyl having 5 to 12 ring carbon atoms or cycloalkyl having 5 to 12 ring carbon atoms which is substituted by 1 to 3 $C_1$-$C_4$alkyl groups. Examples are cyclopentyl, cyclohexyl, cycloheptyl, cyclobutyl, cyclononyl, cyclododecyl, etc., and methylcyclohexyl, dimethylcyclohexyl, trimethylcyclohexyl and tert-butylcyclohexyl.

Examples of 1,3-diketones are: dehydracetic acid, dehydropropionylacetic acid, dehydrobenzoylacetic acid, cyclohexane-1,3-dione, dimedone, 2,2'-methylenebiscyclohexane-1,3-dione, 2-benzylcyclohexane-1,3-dione, acetyltetralone, palmitoyltetralone, stearoyltetralone, benzoyltetralone, 2-acetylcyclohexanone, 2-benzoylcyclohexanone, 2-acetylcyclohexane-1,3-dione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, 4-methoxybenzoylbenzoylmethane, bis(4-methoxybenzoyl)methane, bis(4-chlorobenzoyl)methane, bis(3,4-methylenedioxybenzoyl)methane, benzoylacetyloctylmethane, benzoylacetylphenylmethane, stearoyl-4-methoxybenzoylmethane, bis(4-t-butylbenzoyl)methane, butanoylacetone, heptanoylacetone, distearoylmethane, acetylacetone, stearoylacetone, palmitoylacetone, lauroylacetone, benzoylformylmethane, benzoylphenylacetylmethane, bis(cyclohexane-1,3-dionyl)methane and dipivaloylmethane.

1,3-Diketo compounds which can be used as costabilisers are in particular those described in DE-B 2 600 516 and EP-A 35 268, for example those of the formula given in the claim of DE-B 2 600 516. Preferred 1,3-diketo compounds are benzoylstearoylmethane, alkyl-(for example ethyl) 2-benzoylacetoacetates and triacylmethanes.

Particularly preferred 1,3-diketones are those of the formula IIb,

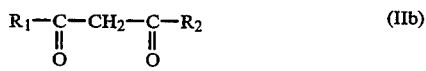

(IIb)

in which $R_1$ is $C_1$-$C_{10}$alkyl, $C_5$-$C_{10}$hydroxyalkyl, phenyl, hydroxyphenyl, $C_7$-$C_{10}$phenylalkyl or $C_7$-$C_{10}$phenylalkyl which is substituted on the phenyl ring by an OH group, and $R_2$ is $C_5$-$C_{10}$hydroxyalkyl, hydroxyphenyl or $C_7$-$C_{10}$phenylalkyl which is substituted on the phenyl ring by an OH group, with the proviso that $R_2$ is not hydroxyphenyl if $R_1$ is phenyl or hydroxyphenyl.

$C_1$-$C_{10}$Alkyl $R_1$ is, for example, methyl, ethyl, n-propyl, isopropyl, n-butyl, tert-butyl, n-pentyl, n-hexyl, n-heptyl, n-octyl or n-decyl. $C_1$-$C_4$Alkyl, in particular methyl, or tert-butyl, is preferred.

Examples of $C_5$-$C_{10}$hydroxyalkyl $R_1$ and $R_2$ are 5-hydroxypentyl, 1,1-dimethyl-3-hydroxypropyl, 6-hydroxyhexyl, 8-hydroxyoctyl and 10-hydroxydecyl. 5-Hydroxypentyl, 6-hydroxyhexyl and 7-hydroxyheptyl are preferred. The hydroxyalkyl group is preferably not in the α-position. $R_2$ is, in particular, a group of the formula —$(CH_2)_n$—OH in which n is an integer from 5 to 7. $R_2$ is particularly preferably 5-hydroxypentyl.

The OH group in hydroxyphenyl $R_1$ and $R_2$ may be in the ortho-, meta- or para-position. o-Hydroxyphenyl is preferred.

Examples of $C_7$-$C_{10}$phenylalkyl $R_1$ are benzyl and 2-phenylethyl.

$R_1$ and $R_2$ as $C_7$-$C_{10}$phenylalkyl which is substituted on the phenyl ring by an OH group are, for example, (2-hydroxyphenyl)methyl, (3-hydroxyphenyl)methyl, (4-hydroxyphenyl)methyl, 2-(2-hydroxyphenyl)ethyl and 2-(4-hydroxyphenyl)ethyl.

Preferred compounds within this group of stabilisers are those of the above formula IIb in which $R_1$ is $C_1$-$C_{10}$alkyl, $C_5$-$C_{10}$hydroxyalkyl, phenyl, hydroxyphenyl, $C_7$-$C_{10}$phenylalkyl or $C_7$-$C_{10}$phenylalkyl which is substituted on the phenyl ring by an OH group, and $R_2$ is $C_5$-$C_{10}$hydroxyalkyl, hydroxyphenyl or $C_7$-$C_{10}$phenylalkyl which is substituted on the phenyl ring by an OH group, with the proviso that $R_2$ is not hydroxyphenyl if $R_1$ is phenyl or hydroxyphenyl.

Particular preference is given to compounds of the above formula IIb in which $R_1$ is $C_1$-$C_{10}$alkyl, $C_5$-$C_{10}$hydroxyalkyl or phenyl, and $R_2$ is $C_5$-$C_{10}$hydroxyalkyl or hydroxyphenyl, and very particular preference is given to those in which $R_1$ is $C_1$-$C_4$alkyl or phenyl, and $R_2$ is $C_5$-$C_7$hydroxyalkyl or hydroxyphenyl, furthermore to those in which $R_2$ is a —$(CH_2)_n$—OH group, in which n is an integer from 5 to 7.

Further examples of particularly preferred compounds of the above formula IIb are those in which $R_1$ is methyl, butyl or phenyl and $R_2$ is 5-hydroxypentyl, 6-hydroxyhexyl, 7-hydroxyheptyl or ortho-hydroxyphenyl.

Specific mention should be made of the preferred compounds of the formula IIb stearoylbenzoylmethane, dibenzoylmethane, 1-phenyl-8-hydroxyoctane-1,3-dione, 1-t-butyl-8-hydroxyoctane-1,3-dione, 1-methyl-8-hydroxyoctane-1,3-dione and 1-(o-hydroxyphenyl) butane-1,3-dione.

Particular preference is also given to 1,3-diketo compounds of the formula IIc

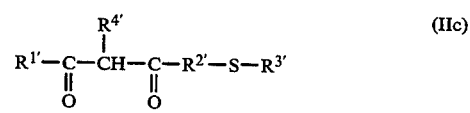

(IIc)

in which $R^{1'}$ and $R^{3'}$, independently of one another, are $C_1$-$C_{12}$alkyl, phenyl, phenyl which is substituted by one to three $C_1$-$C_{12}$alkyl groups, $C_7$-$C_{10}$phenylalkyl or $C_7$-$C_{10}$phenylalkyl which is substituted by one to three $C_1$-$C_{12}$alkyl groups, and $R^{1'}$ is additionally —$R^{2'}$—S—$R^{3'}$, $R^{2'}$ is $C_1$-$C_{10}$alkylene, and $R^{4'}$ is hydrogen, $C_2$-$C_5$alkoxycarbonyl or $C_2$-$C_5$alkanoyl. Further details, examples and preferences are given in EP 307 358.

Expedient polymer compositions are those as described above in which e) is at least one calcium soap of the formula $Ca(OOCR^x)_2$, where $R^x$ is an alkyl group having 1 to 22 carbon atoms, an alkenyl group having 2 to 22 carbon atoms, phenyl, phenyl-$C_1$-$C_4$alkyl or $C_1$-$C_8$alkylphenyl.

Examples of $R^x$ as, for example, an alkyl group having 1 to 22 carbon atoms are methyl, ethyl, propyl, isopropyl, n-butyl, i-butyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl, 1,1,3,3-tetramethylhexyl, 1-methylundecyl, 3,5,5-trimethylhexyl, eicosyl, henicosyl and docosyl.

Examples of $R^x$ as alkenyl having 2 to 22 carbon atoms are allyl, 2-methallyl, 2-butenyl, trans-2-butenyl, 2-hexenyl, trans-2,4-hexadienyl, decenyl, undecenyl, heptadecenyl, oleyl, cis-9-octadecenyl, trans-9-octadecenyl, cis,cis-9, 12-octadecadienyl and cis,cis-cis-9,12,15-octadecatrienyl.

Examples of phenyl-$C_1$-$C_4$alkyl $R^x$ are benzyl and methylbenzyl. Examples of $C_1$-$C_8$alkylphenyl $R^x$ are methylphenyl, ethylphenyl, propylphenyl, n-butylphenyl, di-tert-butylphenyl, octylphenyl, dimethylphenyl, methyl-tert-butylphenyl and di-tert-butylphenyl.

Particularly expedient polymer compositons are those as described above in which the polyalkylpiperidine derivative is a derivative of 2,2,6,6-tetramethylpiperidine.

Particular importance is attached to the following classes of polyalkylpiperidines, which carry at least one group of the formula III, as stated above:

(a) Compounds of the formula IV

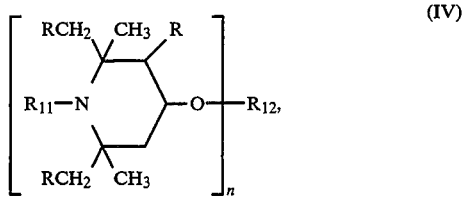

(IV)

in which n is a number from 1 to 4, preferably 1 or 2, R is hydrogen or methyl, $R^{11}$ is hydrogen, oxyl, hydroxyl, $C_1$-$C_{12}$alkyl, $C_3$-$C_8$alkenyl, $C_3$-$C_8$alkynyl, $C_7$-$C_{12}$aralkyl, $C_1$-$C_{18}$alkoxy, $C_5$-$C_8$cycloalkoxy, $C_7$-$C_9$phenylalkoxy, $C_1$-$C_8$alkanoyl, $C_3$-$C_5$alkenoyl, $C_1$-$C_{18}$alkanoyloxy, benzyloxy, glycidyl or a —$CH_2CH(OH)$—Z group, in which Z is hydrogen, methyl or phenyl, $R^{11}$ preferably being H, $C_1$-$C_4$alkyl, allyl, benzyl, acetyl or acryloyl, and $R^{12}$, if n is 1, is hydrogen, $C_1$-$C_{18}$alkyl which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid, or a monovalent silyl radical, preferably a radical of an aliphatic carboxylic acid having 2 to 18 carbon atoms, a cycloaliphatic carboxylic acid having 7 to 15 carbon atoms, an α,β-unsaturated carboxylic acid having 3 to 5 carbon atoms or an aromatic carboxylic acid having 7 to 15 carbon atoms; if n is 2, $R^{12}$ is $C_1$-$C_{12}$alkylene, $C_4$-$C_{12}$alkenylene, xylylene, a divalent radical of an aliphatic, cycloaliphatic, araliphatic or aromatic dicarboxylic acid, dicarbamic acid or phosphorus-containing acid, or a divalent silyl radical, preferably a radical of an aliphatic dicarboxylic acid having 2 to 36 carbon atoms, a cycloaliphatic or aromatic dicarboxylic acid having 8 to 14 carbon atoms or an aliphatic, cycloaliphatic or aromatic dicarbamic acid having 8 to 14 carbon atoms; if n is 3, $R^{12}$ is a trivalent radical of an aliphatic, cycloaliphatic or aromatic tricarboxylic acid, an aromatic tricarbamic acid or a phosphorus-containing acid, or a trivalent silyl radical; and if n is 4, $R^{12}$ is a tetravalent radical of an aliphatic, cycloaliphatic or aromatic tetracarboxylic acid.

Of interest are compounds of the formula IV, with the proviso that, if n=2, $R^{12}$ is not a radical of an aliphatic dicarboxylic acid of the formula —OOC—$(CH_2)_8$—COO—. Also of interest are compounds of the formula IV, with the proviso that, if n=2, $R^{12}$ is not a radical of an aliphatic dicarboxylic acid having 8 to 12 carbon atoms.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$-$C_{18}$alkyl $R^{11}$ and $R^{12}$ are, for example, the groups mentioned above and in addition, for example, n-tridecyl, n-tetradecyl, n-hexadecyl and n-octadecyl.

$C_3$-$C_8$alkenyl $R^{11}$ may be, for example, 1-propenyl, allyl, methallyl, 2-butenyl, 2-pentenyl, 2-hexenyl, 2-octenyl or 4-tert-butyl-2-butenyl.

$C_3$-$C_8$alkynyl $R^{11}$ is preferably propargyl.

$C_7$-$C_{12}$aralkyl $R^{11}$ is, in particular, phenethyl or especially benzyl.

$C_1$-$C_8$alkanoyl $R^{11}$ is, for example, formyl, propionyl, butyryl or octanoyl, but preferably acetyl, and $C_3$-$C_5$alkenoyl $R^{11}$ is, in particular, acryloyl.

If $R^{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $R^{12}$ is a divalent radical of a dicarboxylic acid, it is, for example, a malonyl, succinyl, glutaryl, adipoyl, suberyl, sebacoyl, maleoyl, itaconyl, phthaloyl, dibutylamlonyl, dibenzoylmalonyl, butyl(3,5-di-tert-butyl-4-hydroxybenzyl)malonyl or bicycloheptenedicarbonyl radical.

If $R^{12}$ is a trivalent radical of a tricarboxylic acid, it is, for example, a trimellityl, citryl or nitrilotriacetyl radical.

If $R^{12}$ is a tetravalent radical of a tetracarboxylic acid, it is, for example, the tetravalent radical of butane-1,2,3,4-tetracarboxylic acid or of pyromellitic acid.

If $R^{12}$ is a divalent radical of a dicarbamic acid, it is, for example, a hexamethylenedicarbamoyl or 2,4-tolylenedicarbamoyl radical.

Preference is given to compounds of the formula IV in which R is hydrogen, $R^{11}$ is hydrogen or methyl, n is 2 and $R^{12}$ is the diacyl radical of an aliphatic dicarboxylic acid having 4 to 12 carbon atoms.

Examples of polyalkylpiperidine compounds of this class are the following compounds:

1) 4-Hydroxy-2,2,6,6-tetramethylpiperidine
2) 1-Allyl-4-hydroxy-2,2,6,6-tetramethylpiperidine
3) 1-Benzyl-4-hydroxy-2,2,6,6-tetramethylpiperidine
4) 1-(4-tert-Butyl-2-butenyl)-4-hydroxy-2,2,6,6-tetramethylpiperidine
5) 4-Stearoyloxy-2,2,6,6-tetramethylpiperidine
6) 1-Ethyl-4-salicyloyloxy-2,2,6,6-tetramethylpiperidine
7) 4-Methacryloyloxy-1,2,2,6,6-pentamethylpiperidine
8) 1,2,2,6,6-Pentamethylpiperidin-4-yl-β-(3,5-di-tert.-butyl-4-hydroxyphenyl) propionate
9) Di(1-benzyl-2,2,6,6-tetramethylpiperidin-4-yl) maleate
10) Di(2,2,6,6-tetramethylpiperidin-4-yl) succinate
11) Di(2,2,6,6-tetramethylpiperidin-4-yl) glutarate
12) Di(2,2,6,6-tetramethylpiperidin-4-yl) adipate
13) Di(2,2,6,6-tetramethylpiperidin-4-yl) sebacate
14) Di(1,2,2,6,6-pentamethylpiperidin-4-yl) sebacate
15) Di(1,2,3,6-tetramethyl-2,6-diethyl-piperidin-4-yl) sebacate
16) Di(1-allyl-2,2,6,6-tetramethylpiperidin-4-yl) phthalate 17) 1-Hydroxy-4-β-cyanoethyloxy-2,2,6,6-tetramethylpiperidine
18) 1-Acetyl-2,2,6,6-tetramethylpiperidin-4-yl acetate
19) Tri-(2,2,6,6-tetramethylpiperidin-4-yl) trimellitate,
20) 1-Acryloyl-4-benzyloxy-2,2,6,6-tetramethylpiperidine
21) Di(2,2,6,6-tetramethylpiperidin-4-yl)diethylmalonate
22) Di(1,2,2,6,6-pentamethylpiperidin-4-yl)dibutylmalonate
23) Di(1,2,2,6,6-pentamethylpiperidin-4-yl) butyl(3,5-di-tert-butyl-4-hydroxybenzyl)malonate
24) Di(1-octyloxy-2,2,6,6-tetramethylpiperidin-4-yl) sebacate
25) Di(1-cyclohexyloxy-2,2,6,6-tetramethylpiperidin-4-yl) sebacate
26) Hexane-1',6'-bis(4-carbamoyloxy-1-n-butyl-2,2,6,6-tetramethylpiperidine)
27) Toluene-2',4'-bis(4-carbamoyloxy-1-n-propyl-2,2,6,6-tetramethylpiperidine)
28) Dimethylbis(2,2,6,6-tetramethylpiperidin-4-oxy)silane
29) Phenyltris(2,2,6,6-tetramethylpiperidin-4-oxy)silane
30) Tris(1-propyl-2,2,6,6-tetramethylpiperidin-4-yl) phosphite
31) Tris(1-propyl-2,2,6,6-tetramethylpiperidin-4-yl) phosphate
32) Phenyl bis(1,2,2,6,6-pentamethylpiperidin-4-yl) phosphonate
33) 4-Hydroxy-1,2,2,6,6-pentamethylpiperidine
34) 4-Hydroxy-N-hydroxyethyl-2,2,6,6-tetramethylpiperidine
35) 4-Hydroxy-N-(2-hydroxypropyl)-2,2,6,6-tetramethylpiperidine
36) 1-Glycidyl-4-hydroxy-2,2,6,6-tetramethylpiperidine (b) Compounds of the formula (V)

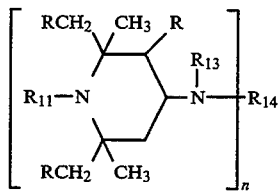

in which n is the number 1 or 2, R and $R^{11}$ are as defined under (a), $R^{13}$ is hydrogen, $C_1$-$C_{12}$alkyl, $C_2$-$C_5$hydroxyalkyl, $C_5$-$C_7$cycloalkyl, $C_7$-$C_8$aralkyl, $C_2$-$C_{18}$alkanoyl, $C_3$-$C_5$alkenoyl, benzoyl or a group of the formula

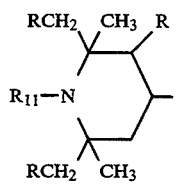

and, if n is 1, $R^{14}$ is hydrogen, $C_1$-$C_{18}$alkyl, $C_3$-$C_8$alkenyl, $C_5$-$C_7$cycloalkyl, $C_{1-4}$alkyl which is substituted by a hydroxyl, cyanol, alkoxycarbonyl or carbamide group, glycidyl, a group of the formula —$CH_2$—$CH(OH)Z$ or of the formula —$CON$-$H$—$Z$, in which Z is hydrogen, methyl or phenyl; if n is 2, $R^{14}$ is $C_2$-$C_{12}$alkylene, $C_6$-$C_{12}$arylene, xylylene, a —$CH_2$—$CH(OH)$—$CH_2$— group or a —$CH_2$—$CH(OH)$—$CH_2$—$O$—$D$—$O$— group, in which D is $C_2$-$C_{10}$alkylene, $C_6$-$C_{15}$ arylene or $C_6$-$C_{12}$cycloalkylene, or, provided that $R^{13}$ is not alkanoyl, alkenoyl or benzoyl, $R^{14}$ may alternatively be a divalent radical of an aliphatic, cycloaliphatic or aromatic dicarboxylic acid or a dicarbamic acid or the —$CO$— group, or $R^{13}$ and $R^{14}$ together, if n is 1, may be the divalent radical of an aliphatic, cyloaliphatic or aromatic 1,2- or 1,3-dicarboxylic acid.

Any $C_1$-$C_{12}$alkyl or $C_1$-$C_{18}$alkyl substituents are as defined above under (a).

Any $C_5$-$C_7$cycloalkyl substituents are, in particular, cyclohexyl.

$C_7$-$C_8$aralkyl $R^{13}$ is, in particular, phenylethyl or especially benzyl. $C_2$-$C_5$-Hydroxyalkyl $R^{13}$ is, in particular, 2-hydroxyethyl or 2-hydroxypropyl.

$C_2$-$C_{18}$alkanoyl $R^{13}$ is, for example, propionyl, butyryl, octanoyl, dedecanoyl, hexadecanoyl, octadecanoyl, but preferably acetyl, and $C_3$-$C_5$alkenoyl $R^3$ is, in particular, acryloyl.

$C_2$-$C_8$alkenyl $R^{14}$ is, for example, allyl, methallyl, 2-butenyl, 2-pentenyl, 2-hexenyl or 2-octenyl.

$R^{14}$ as $C_{1-4}$alkyl which is substituted by a hydroxyl, cyano, alkoxycarbonyl or carbamide group can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_{12}$alkylene substituents are, for example, ethylene, propylene, 2,2-dimethylpropylene, tetramethylene, hexamethylene, octamethylene, decamethylene or dodecamethylene.

Any $C_6$-$C_{15}$arylene substituents are, for example, o-, m- or p-phenylene, 1,4-naphthylene or 4,4'-diphenylene.

$C_6$-$C_{12}$cycloalkylene is, in particular, cyclohexylene.

Preference is given to compounds of the formula V in which n is 1 or 2, R is hydrogen, $R^{11}$ is hydrogen or methyl, $R^{13}$ is hydrogen, $C_1$-$C_{12}$alkyl or a group of the formula

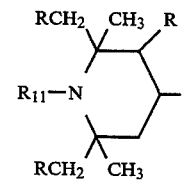

and $R^{14}$, if n=1, is hydrogen or $C_1$-$C_{12}$alkyl, or if n=2, $R^{14}$ is $C_2$-$C_8$alkylen.

Examples of polyalkylpiperidine compounds of this class are the following compounds:

37) N,N'-Bis(2,2,6,6-tetramethylpiperidin-4-yl)hexamethylene-1, 6-diamine
38) N,N'-Bis(2,2,6,6-tetramethylpiperidin-4-yl)hexamethylen-1,6-diacetamide
39) Bis(2,2,6,6-tetramethylpiperidin-4-yl)amine
40) 4-Benzoylamino-2,2,6,6-tetramethylpiperidine
41) N,N'-Bis(2,2,6,6-tetramethylpiperidin-4-yl)-N,N'-dibutyladipamide
42) N,N'-Bis(2,2,6,6-tetramethylpiperidin-4-yl)-N,N'-dicyclohexyl-2-hydroxypropylene-1,3-diamine
43) N,N'-Bis(2,2,6,6-tetramethylpiperidin-4-yl)-p-xylylenediamine
44) N,N'-Bis(2,2,6,6-tetramethylpiperidin-4-yl)succinamide 45) Di(2,2,6,6-tetramethylpiperidin-4-yl) N-(2,2,6,6-tetramethylpiperidin-4-yl)-β-aminodipropionate
46) The compound of the formula

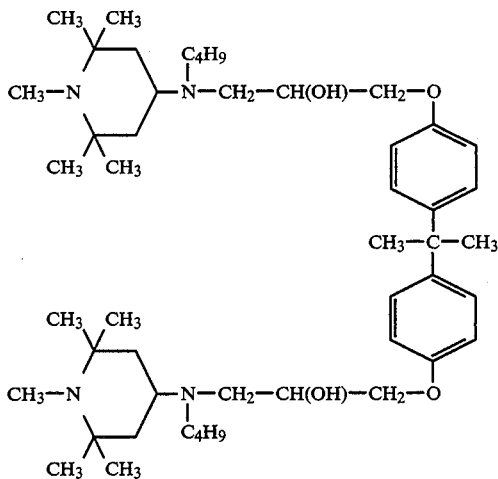

47) 4-(Bis-2-hydroxyethylamino)-1,2,2,6,6-pentamethylpiperidine
48) 4-(3-Methyl-4-hydroxy-5-tert-butylbenzamido)-2,2,6,6-tetramethylpiperidine
49) 4-Methacrylamido-1,2,2,6,6-pentamethylpiperidine (c) Compounds of the formula (VI)

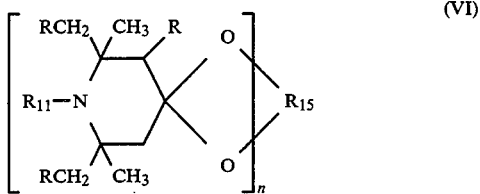

(VI)

in which n is the number 1 or 2, R and $R^{11}$ are as deemed under (a), and $R^{15}$, if n is 1, is $C_2$-$C_8$alkylene or -hydroxyalkylene or $C_4$-$C_{22}$acyloxyalkylene and, if n is 2, $R^{15}$ is the (—$CH_2$)$_2$C($CH_2$—)$_2$ group.

$C_2$-$C_8$alkylene or hydroxyalkylene $R^{15}$ is, for example, ethylene, 1-methylethylene, propylene, 2-ethylpropylene or 2-ethyl-2-hydroxymethylpropylene.

$C_4$-$C_{22}$acyloxyalkylene $R^{15}$ is, for example, 2-ethyl-2-acetoxymethylpropylene.

Examples of polyalkylpiperidine compounds of this class are the following compounds:

50) 9-Aza-8,8,10,10-tetramethyl-1,5-dioxaspiro[5.5]undecane
51) 9-Aza-8,8,10,10-tetramethyl-3-ethyl-1,5-dioxaspiro[5.5]undecane
52) 8-Aza-2,7,7,8,9,9-hexamethyl-1,4-dioxaspiro[4.5]decane
53) 9-Aza-3-hydroxymethyl-3-ethyl-8,8,9,10,10-pentamethyl-1,5-dioxaspiro[5.5]undecane
54) 9-Aza-3-ethyl-3-acetoxymethyl-9-acetyl-8,8,10,10-tetramethyl-1,5-dioxaspiro[5.5]undecane
55) 2,2,6,6-Tetramethylpiperidin-4-spiro-2'-(1',3'-dioxan)-5'-spiro-5''-(1'',3''-dioxan)-2''-spiro-4'''-(2''',2''',6''',6'''-tetramethylpiperidine).

(d) Compounds of the formulae VIIA, VIIB and VIIC, compounds of the formula VIIA being preferred,

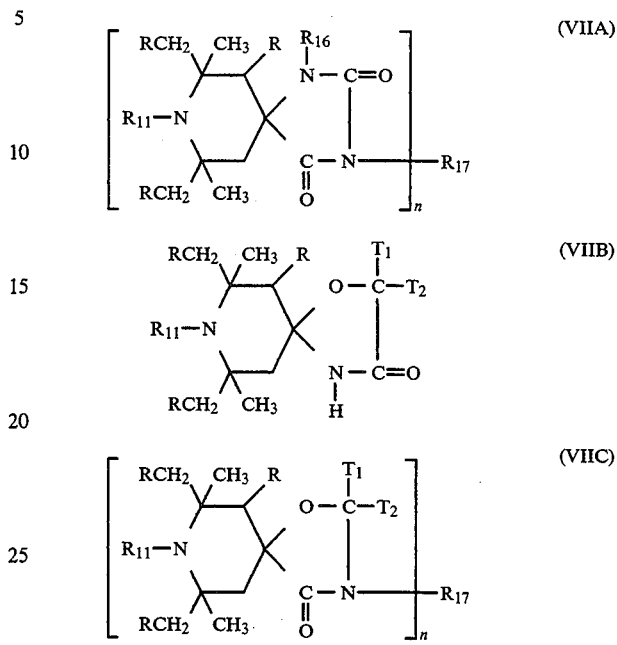

in which n is the number 1 or 2, R and $R^{11}$ are as defined under (a), $R^{16}$ is hydrogen, $C_1$-$C_{12}$alkyl, allyl, benzyl, glycidyl or $C_2$-$C_6$alkoxyalkyl, and $R^{17}$, if n is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the formula —($CH_2$)$_p$—COO—Q or of the formula —($CH_2$)$_p$—O—CO—Q, in which p is 1 or 2 and Q is $C_1$-$C_4$alkyl or phenyl; if n is 2, $R^{17}$ is $C_2$-$C_{12}$alkylene, $C_4$-$C_{12}$alkenylene, $C_6$-$C_{12}$arylene, a —$CH_2$—CH(OH)—$CH_2$—O—D—O—$CH_2$—CH(OH)—$CH_2$—group, in which D is $C_2$-$C_{10}$alkylen, $C_6$-$C_{15}$-arylen, or $C_6$-$C_{12}$cycloalkylen, or a —$CH_2CH(OZ')$C$H_2$—(O$CH_2$—CH(OZ') $CH_2$)$_2$—group, in which Z' is hydrogen, $C_1$-$C_{18}$alkyl, allyl, benzyl, $C_2$-$C_{12}$alkanoyl or benzoyl, $T_1$ and $T_2$ independently of one another, are hydrogen, $C_1$-$C_{18}$alkyl or $C_6$-$C_{10}$aryl, which is unsubstituted or substituted by halogen, or $C_1$-$C_4$alkyl, or $C_7$-$C_9$aralkyl, or $T_1$ and $T_2$, together with the carbon atom connecting them, form a $C_5$-$C_{12}$cycloalkane ring.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$-$C_{18}$alkyl substituents may be, for example, the abovementioned groups or furthermore, for example, n-tridecyl, n-tetradecyl, n-hexadecyl or n-octadecyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$-$C_5$alkenyl $R^{17}$ is, for example, 1-propenyl, allyl, methallyl, 2-butenyl or 2-pentenyl.

$C_7$-$C_9$aralkyl $R^{17}$, $T_1$ and $T_2$ are, in particular, phenethyl or especially benzyl. If $T_1$ and $T_2$, together with the carbon atom, form a cycloalkane ring, this may be, for example, a cyclopentane, cyclohexane, cyclooctane or cyclododecane ring.

$C_2-C_4$hydroxyalkyl $R^{17}$ is, for example, 2-hydroxyethyl, 2-hydroxypropyl, 2-hydroxybutyl or 4-hydroxybutyl.

$C_6-C_{10}$aryl $R^{17}$, $T_1$ and $T_2$ are, in particular, phenyl or α- or β-naphthyl, which are unsubstituted or substituted by halogen or $C_1-C_4$alkyl.

$C_2-C_{12}$alkylene $R^{17}$ is, for example, ethylene, propylene, 2,2-dimethylpropylene, tetramethylene, hexamethylene, octamethylene, decamethylene or dodecamethylene.

$C_4-C_{12}$alkenylene $R^{17}$ is, in particular, 2-butenylene, 2-pentenylene or 3-hexenylene.

$C_6-C_{12}$arylene $R^{17}$ is, for example, o-, m- or p-phenylene, 1,4-naphthylene or 4,4'-diphenylene.

$C_2-C_{12}$alkanoyl $Z'$ is, for example, propionyl, butyryl, octanoyl or dodecanoyl, but preferably acetyl.

$C_2-C_{10}$alkylene, $C_6-C_{15}$arylene or $C_6-C_{12}$cycloalkylene D is as defined under (b).

Examples of polyalkylpiperidine compounds of this class are the following compounds:

56) 3-Benzyl-1,3,8-triaza-7,7,9,9-tetramethylspiro[4.5]-decane-2,4-dione
57) 3-n-Octyl-1,3,8-triaza-7,7,9,9-tetramethylspiro[4.5]-decane-2,4-dione
58) 3-Allyl-1,3,8-triaza-1,7,7,9,9-pentamethylspiro[4.5]-decane-2,4-dione
59) 3-Glycidyl-1,3,8-triaza-7,7,8,9,9-pentamethylspiro[4.5]decane-2,4-dione
60) 1,3,7,7,8,9,9-Heptamethyl-1,3,8-triazaspiro[4.5]decane-2,4-dione
61) 2-Isopropyl-7,7,9,9-tetramethyl-1-oxa-3,8-diaza-4-oxospiro[4.5]decane
62) 2,2-Dibutyl-7,7,9,9-tetramethyl-1-oxa-3,8-diaza-4-oxospiro[4.5]decane
63) 2,2,4,4-Tetramethyl-7-oxa-3,20-diaza-21-oxodispiro[5.1.11.2]heneicosane
64) 2-Butyl-7,7,9,9-tetramethyl-1-oxa-4,8-diaza-3-oxospiro[4,5]decane and preferably:
65) 8-Acetyl-3-dodecyl-1,3,8-triaza-7,7,9,9-tetramethylspiro[4.5]decane-2,4-dione or the compounds of the following formulae:

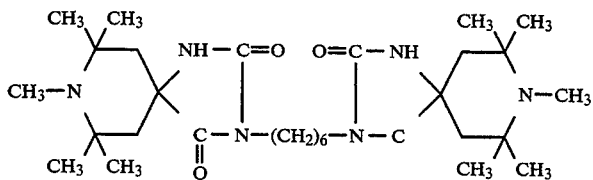

66)

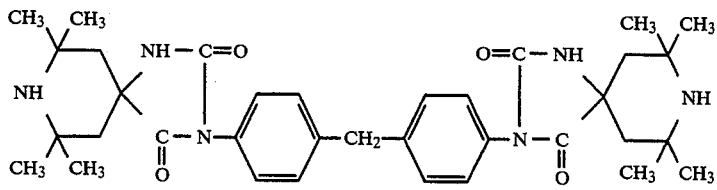

67)

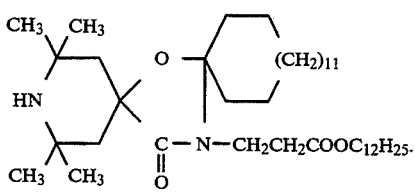

68)

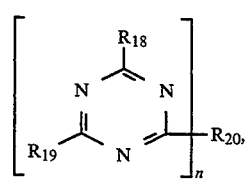

69)

(e) Compounds of the formula VIII, which are themselves preferred,

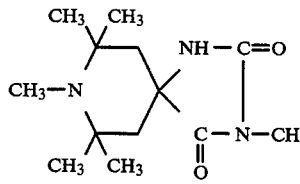

(VIII)

in which n is the number 1 or 2, and $R^{18}$ is a group of the formula

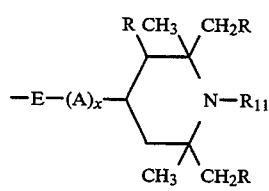

in which R and $R^{11}$ are as defined under (a), E is —O— or —$NR^{11}$—, A is $C_2-C_6$alkylene or —$(CH_2)_3$—O—, and x is the number 0 or 1, $R^{19}$ is identical to $R^{18}$ or is one of the groups —$NR^{21}R^{22}$, —$OR^{23}$, —$NHCH_2OR^{23}$ and —$N(CH_2OR^{23})_2$, $R^{20}$, if n=1, is identical to $R^{18}$ or $R^{19}$ and, if n=2, is a —E—B—E— group, in which B is $C_2$-$C_6$alkylene, which may be interrupted by —N($R^{21}$)—, $R^{21}$ is $C_{1-12}$alkyl, cyclohexyl, benzyl or $C_1$-$C_4$hydroxyalkyl or a group of the formula

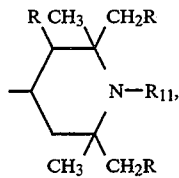

$R^{22}$ is $C_1$-$C_{12}$alkyl, cyclohexyl, benzyl or $C_1$-$C_4$-hydroxyalkyl, and $R^{23}$ is hydrogen, $C_1$-$C_{12}$alkyl or phenyl, or $R^{21}$ and $R^{22}$ together are $C_4$-$C_5$alkylene or -oxaalkylene, for example

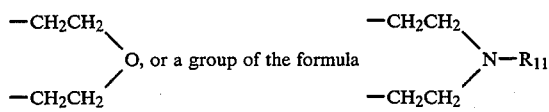

or alternatively $R^{21}$ and $R^{22}$ are each a group of the formula

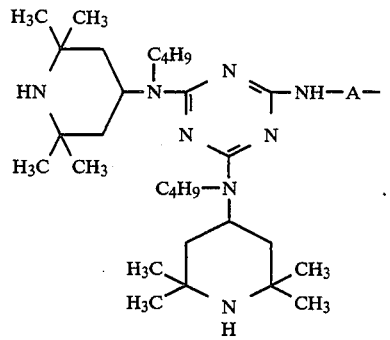

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$-$C_4$hydroxyalkyl substituents are, for example, 2-hydroxyethyl, 2-hydroxypropyl, 3-hydroxypropyl, 2-hydroxybutyl or 4-hydroxybutyl.

$C_2$-$C_6$alkylene A is, for example, ethylene, propylene, 2,2-dimethylpropylene, tetramethylene or hexamethylene.

If $R^{21}$ and $R^{22}$ together are $C_4$-$C_5$alkylene or -oxaalkylene, this is, for example, tetramethylene, pentamethylene or 3-oxapentamethylene.

Examples of polyalkylpiperidine compounds of this class are the compounds of the following formulae:

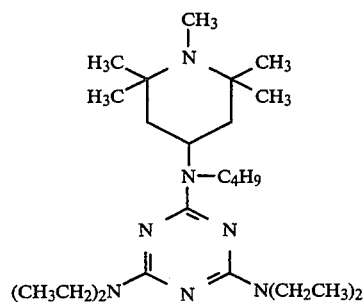

70)

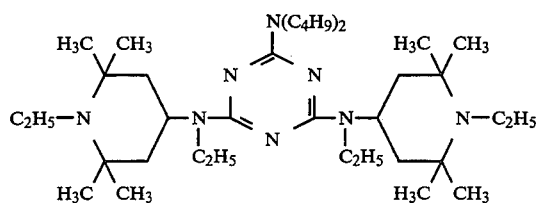

71)

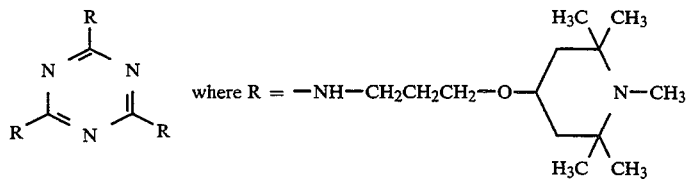

72)

-continued
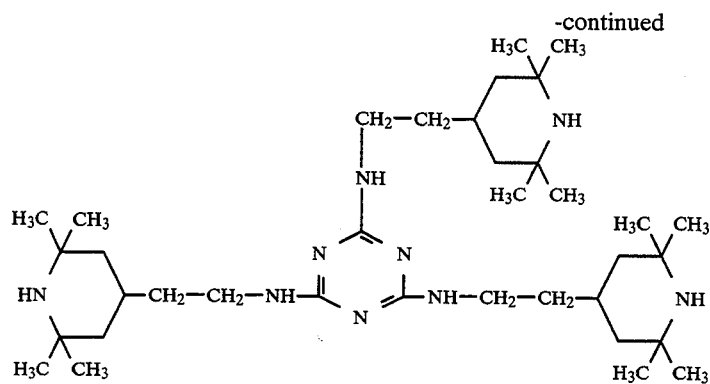
73)
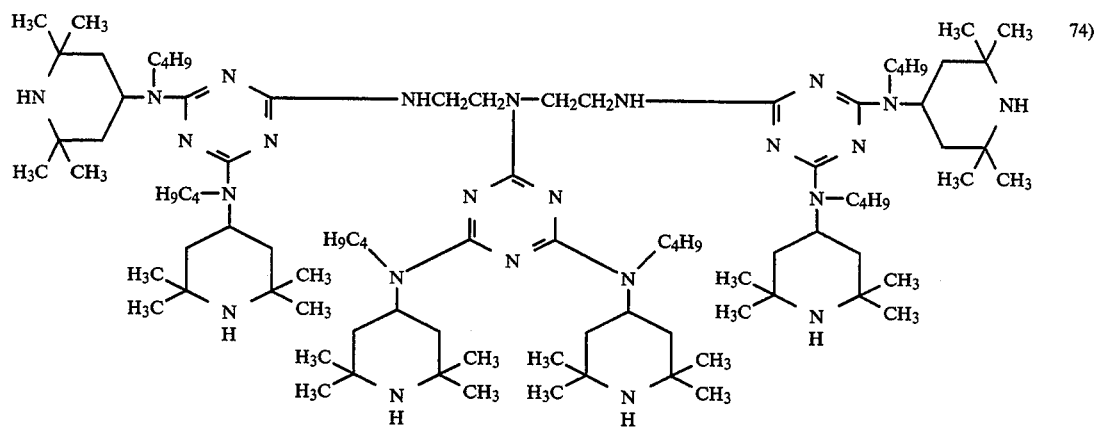
74)
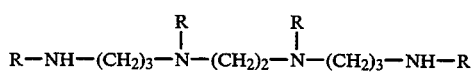
75)
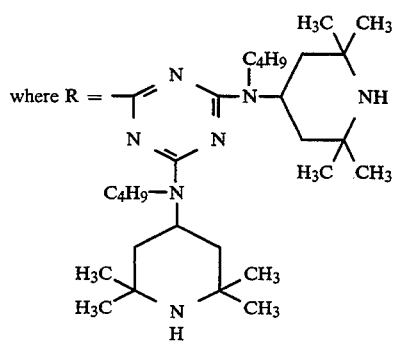
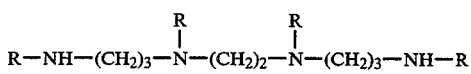
76)
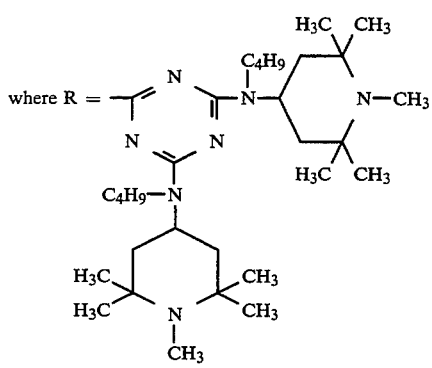
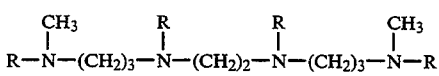
77)

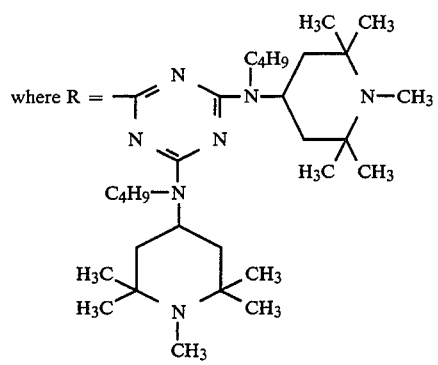

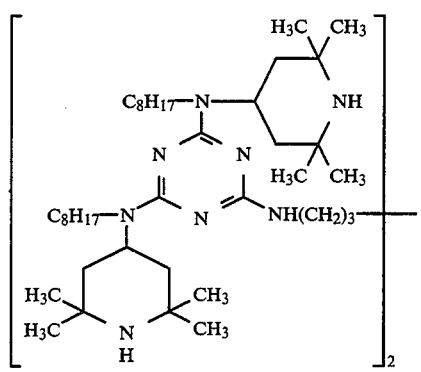

78)

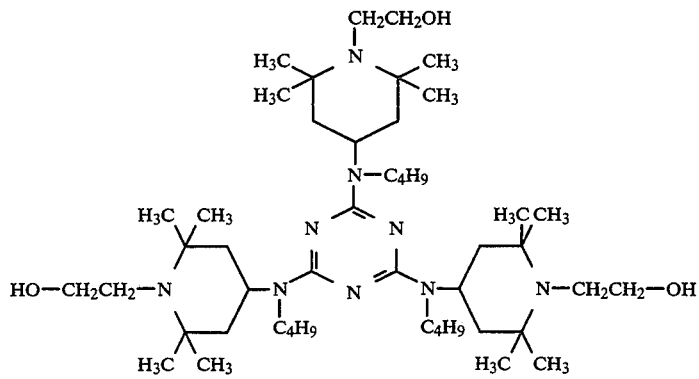

79)

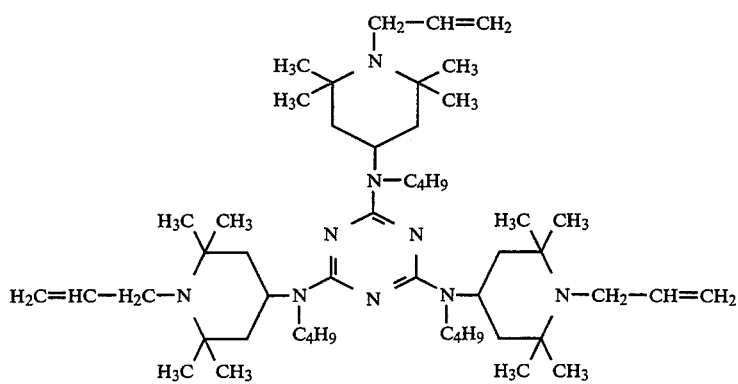

80)

(f) Oligomeric or polymeric compounds whose recurring structural unit contains a 2,2,6,6-tetraalkyl-piperidine radical of the formula III, in particular polyesters, polyethers, polyamides, polyamines, polyurethanes, polyureas, polyaminotriazines, poly(meth)acrylates, poly(meth)acrylamides, and copolymers thereof which contain these radicals.

Examples of 2,2,6,6-polyalkylpiperidine light stabilisers of this class are the compounds of the following formulae, where m is a number from 2 to about 200.

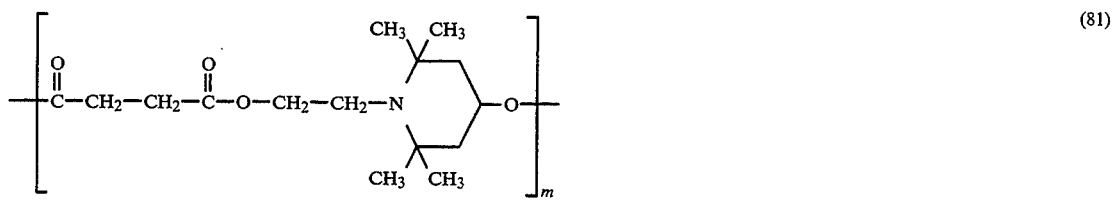 (81)
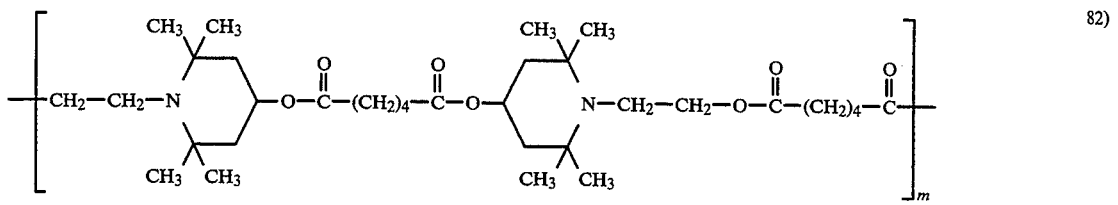 (82)
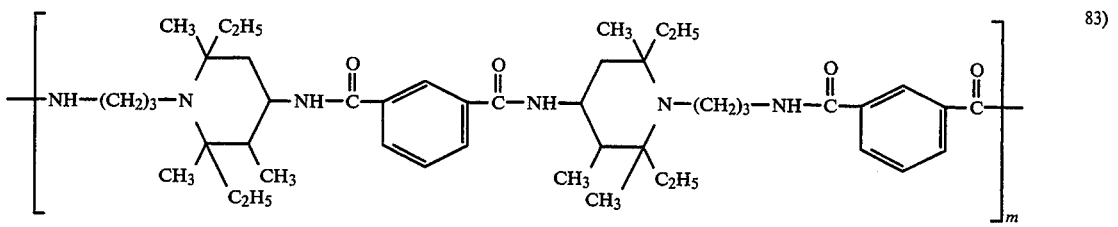 (83)
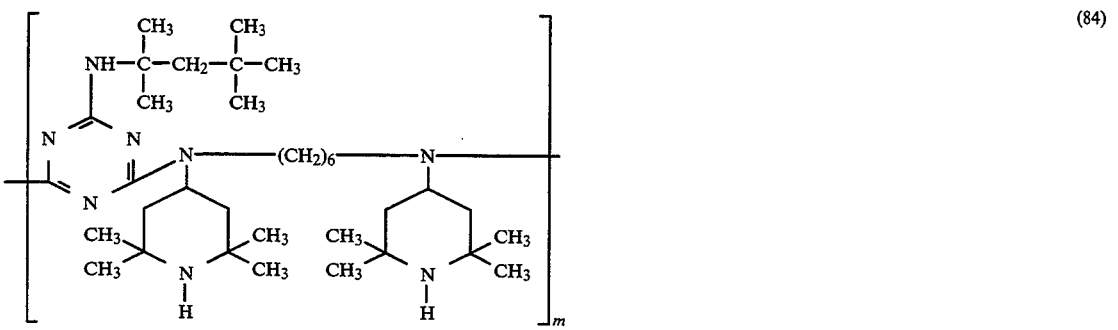 (84)
 (85)
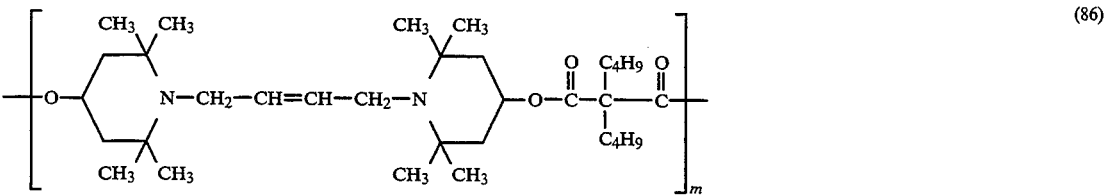 (86)
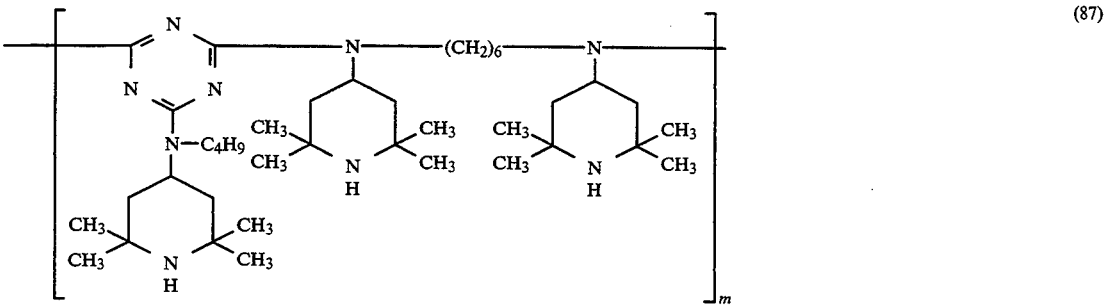 (87)

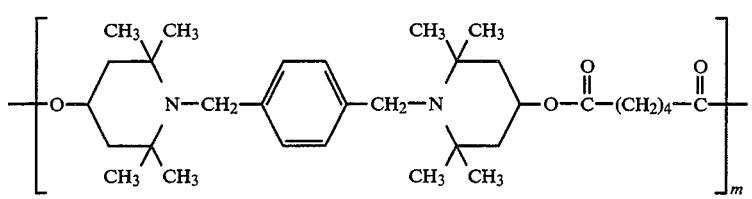
(88)
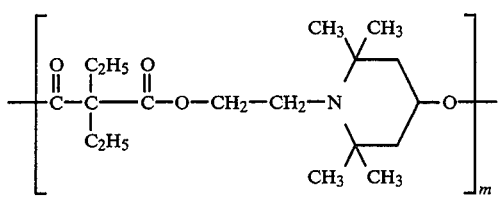
(89)
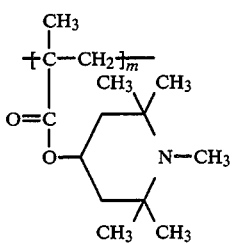
(90)
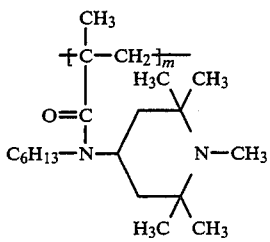
(91)
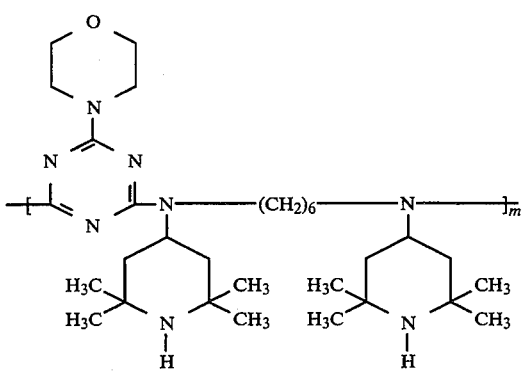
(92)
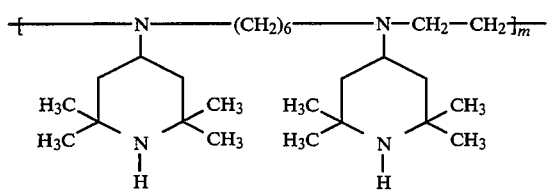
(93)

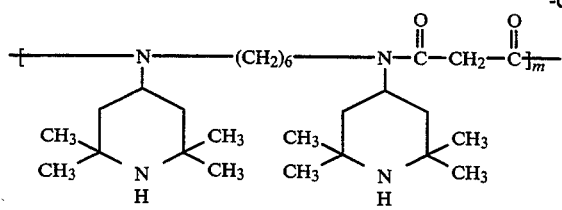

94)

(g) Compounds of the formula IX

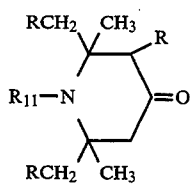

in which R and $R^{11}$ are as defined under (a).

Preference is given to compounds of the formula IX in which R is hydrogen or methyl, and $R^{11}$ is hydrogen or methyl.

Examples of such compounds are:

95) 2,2,6,6-Tetramethyl-4-piperidone (triacetoneamine)
96) 1,2,2,6,6-Pentamethyl-4-piperidone
97) 2,2,6,6-Tetramethyl-4-piperidone 1-oxide
98) 2,3,6-Trimethyl-2,6-diethyl-4-piperidone.

Component a) in the compositions according to the invention is particularly expediently a cyclic, sterically hindered amine containing no ester groups and preferably containing at least one triazine ring in the molecule. Amines of this type preferably contain at least one group of the formula III and particularly preferably belong to one of the types (a) to (g) outlined above.

Preference is given to polymer compositions as described in which b) is an organic zinc compound, where the zinc compound is a salt of a carboxylic acid having 7 to 20 carbon atoms or a $C_7$–$C_{20}$alkyl phenolate.

The zinc compounds from the series consisting of the carboxylates are preferably salts of carboxylic acids having 7 to 20 carbon atoms, for example benzoates, alkenoates or alkanoates, preferably stearates, oleates, laurates, palmitates, hydroxystearates or 2-ethylhexanoates. Particular preference is given to stearates, oleates and p-tert-butylbenzoates.

Examples which may be mentioned by name are the zinc salts of monovalent carboxylic acids, such as acetic acid, propionic acid, butyric acid, valeric acid, caproic acid, enanthic acid, caprylic acid, neodecanoic acid, 2-ethylhexanoic acid, pelargonic acid, capric acid, undecanoic acid, lauric acid, tridecanoic acid, myristic acid, palmitic acid, isostearic acid, stearic acid, 12-hydroxystearic acid, behenic acid, montanic acid, benzoic acid, monochlorobenzoic acid, p-tert-butylbenzoic acid, dimethylhydroxybenzoic acid, 3,5-di-tert-butyl-4-hydroxybenzoic acid, tolic acid, dimethylbenzoic acid, ethylbenzoic acid, cumic acid, n-propylbenzoic acid, aminobenzoic acid, N,N-dimethylbenzoic acid, acetoxybenzoic acid, salicylic acid, p-tert-octylsalicylic acid, oleic acid, elaidic acid, sorbic acid, lonoleic acid, linolenic acid, thioglycolic acid, mercaptopropionic acid and octylmercaptopropionic acid; zinc salts of the monoesters and monoamides of divalent carboxylic acids, such as oxalic acid, malonic acid, succinic acid, glutamic acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, mesaconic acid, itaconic acid, aconitric and thiodipropionic acid; and the diesters or triesters of trivalent or tetravalent carboxylic acids, such as hemimellitic acid, trimellitic acid, mellophanic acid, pyromellitic acid and mellitic acid.

Examples which may be mentioned of chelates of 1,3-diketones and β-ketocarboxylic esters are compounds of the formula $$Zn(R-\underset{\underset{O}{\|}}{C}-C(R')-\underset{\underset{O}{\|}}{C}-R'')_2$$

where R, R' and R'', independently of one another, are alkyl having 1 to 18 carbon atoms, alkenyl having 2 to 18 carbon atoms, cycloalkyl having 5 to 12 ring carbon atoms, cycloalkyl having 5 to 12 ring carbon atoms which is substituted by 1 to 3 $C_1$–$C_4$alkyl groups, alkyl having 1 to 18 carbon atoms which is substituted by cycloalkyl having 5 to 12 ring carbon atoms, phenyl-$C_1$–$C_{18}$alkyl, $C_1$–$C_{18}$alkylphenyl, phenyl, haloalkyl, halophenyl, alkoxyalkyl or alkylenedioxyalkyl or -phenyl, R' may in addition be hydrogen.

Examples of R, R' and R'' are methyl, ethyl, propyl, isopropyl, isobutyl, n-butyl, sec-butyl, tert-butyl, 1-pentyl, 3-pentyl, 1-hexyl, 1-heptyl, 3-heptyl, 1-octyl, 2,4,4-trimethylphenyl, tert-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexylpropyl, phenyl, m-tolyl, p-ethylphenyl, tert-butylphenyl, benzyl, phenylpropyl and nonylbenzyl.

Examples of haloalkyl and halophenyl are dichloromethyl, heptafluoropropyl, p-bromophenyl and 3,4-dichlorobenzyl. Alkoxyalkyl can be ethoxymethyl, n-butoxymethyl, 2-methoxyethyl, 2-methoxyphenyl or 4-n-octoxyphenylbenzyl. Alkylenedioxyalkyl or -phenyl can be, for example, 3-(ethylenedioxypropyl) or 3,4-methylenedioxyphenyl.

All the 1,3-diketones which have already been mentioned, but are not included in the above list can also be employed correspondingly in the form of their zinc chelates as organic zinc compounds.

Preference is given to polymer compositions as described above in which c) is at least one compound of the series consisting of the zeolites.

Preference is given to polymer compositions as described above which contain at least one of the compounds of the formulae $Na_{12}Al_{12}Si_{12}O_{48}\cdot 27\ H_2O$ [zeolite A], $Na_6Al_6Si_6O_{24}\cdot 2\ NaX\cdot 7,5\ H_2O$, X=OH, Cl, $ClO_4$, ½$CO_3$ [sodalite]

$Na_6Al_6Si_{30}O_{72}\cdot 24\ H_2O$, $Na_8Al_8Si_{40}O_{96}.24\ H_2O$, $Na_{16}Al_{16}Si_{24}O_{80}.16\ H_2O$, $Na_{16}Al_{16}Si_{32}O_{96}.16\ H_2O$, $Na_{56}Al_{56}Si_{136}O_{384}.250\ H_2O$, [zeolite Y]

$Na_{86}Al_{86}Si_{106}P_{384}.264\ H_2O$ [zeolite X]

or the zeolites which can be formed by replacement of some or all of the Na atoms by Li, K, Mg, Ca, Sr, Ba or Zn atoms, such as $(Na,K)_{10}Al_{10}Si_{22}O_{64}.20\ H_2O$.

$Ca_{4.5}Na_3[(AlO_2)_{12}(SiO_2)_{12}].30\ H_2O$ $K_9Na_3[(AlO_2)_{12}].27\ H_2O$

The cited zeolites may have a lower water content or may be anhydrous.

The polymer compositions may also contain further organic or inorganic calcium compounds and additionally barium and magnesium compounds. Preference is given to calcium compounds. It is expedient to use at least one organic or inorganic calcium, barium and/or magnesium compound from the series consisting of the aliphatic $C_1-C_{22}$carboxylates, olefinic $C_2-C_{22}$carboxylates, aliphatic $C_2-C_{22}$carboxylates which are substituted by at least one OH group, cyclic and bicyclic carboxylates having 5 to 22 carbon atoms, aromatic $C_6-C_{22}$carboxylates, aromatic $C_6-C_{22}$carboxylates which are substituted by at least one OH group, $C_1-C_{16}$alkyl-substituted phenyl carboxylates, phenyl-$C_1-C_{16}$alkyl carboxylates, $C_6-C_{18}$phenolates, $C_5-C_{26}$-chelates of 1,3-diketones or $\beta$-ketocarboxylic esters, decahyctracetic acid and derivatives thereof, carbonates, sulfates oxides, hydroxides, basic oxides and mixed oxides, mercaptides based on mercaptocarboxylic esters, glycinates, phosphates, phosphites, phosphonites, phosphonates, partial esters of phosphonates, sulfonates and sulfinates, where the carbonates, sulfates and phosphites may also be used in superbasic forms.

Examples and preferences for the organic and inorganic calcium and additionally barium and magnesium compounds can be derived correspondingly from the examples and preferences given for the zinc compounds. In each case, the zinc is replaced by one of the metals from the series consisting of calcium, barium and magnesium.

The chlorine-containing polymers can be those listed below: polymers of vinyl chloride, vinyl resins containing vinyl chloride units in their structure, such as copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and similar; polymers of vinylidene chloride and copolymers thereof with vinyl chloride and other polymerisable compounds; polymers of vinyl chloroacetates and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of said polymers with one another or with other polymerisable compounds.

Also suitable are graft polymers of PVC with EVA, ABS and MBS. Preferred substrates are also mixtures of the abovementioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and polylactones.

Also preferred are suspension, bulk and emulsion polymers.

The particularly preferred chlorine-containing polymer is polyvinyl chloride, in particular suspension or bulk polyvinyl chloride.

Expedient polymer compositions are those as described above which comprise, based on 100 parts by weight of the composition, a) from 0.01 to 1.5 parts by weight of cyclic or noncyclic, sterically hindered amines, b) from 0.01 to 2 parts by weight of organic or inorganic zinc compounds and c) from 0.1 to 3 parts by weight of compounds from the series consisting of crystalline alkali metal/alkaline earth metal alumosilicates.

The amounts of the sterically hindered amines in the polymer composition are preferably in the range from 0.05 to 1.0 part by weight, particularly preferably from 0.1 to 0.5 part by weight, based on 100 parts by weight of composition.

The amounts of the zinc compounds in the polymer composition are preferably in the range from 0.05 to 1 part by weight, based on 100 parts by weight of composition.

The amounts of the crystalline alkali metal/alkaline earth metal alumosilicate in the polymer composition are preferably in the range from 0.3 to 2 parts by weight, particularly preferably from 0.4 to 1 part by weight, based on 100 parts by weight of composition.

The chlorine-containing polymer may contain a plasticiser, preference being given to chlorine-containing polymers containing no plasticiser.

Examples of suitable organic plasticisers are those from the following groups:

A) Phthalates (esters of phthalic acid)

Examples of these plasticisers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7-C_9$-and $C_9-C_{11}$alkyl phthalates made from predominantly linear alcohols, $C_6-C_{10}$-n-alkyl phthalates and $C_8-C_{10}$-n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl phthalate (DOP).

B) Esters of aliphatic dicarboxylic acids, in particular esters of adipic, azelaic and sebacic acids Examples of these plasticisers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6$–$C_8$alkyl, tri-$C_6$–$C_{10}$alkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Polymer plasticisers

A definition of these plasticisers and examples thereof are given in "Plastics Additives Handbook", Editors H. Gächter and H. Müller, Hanser Publishers, 1985, page 284, chapter 5.7.10, and in "PVC Technology", Editor W. V. Titow, 4th Ed., Elsevier Publ., 1984, pages 165–170. The most usual starting materials for the preparation of polyester plasticisers are dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticisers made from said dicarboxylic acids and monofunctional alcohols.

E) Esters of phosphoric acid

A definition of these esters is given in the abovementioned "Plastics Additives Handbook" on page 271, chapter 5.7.2. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate.

F) Chlorinated hydrocarbons (paraffins)

G) Hydrocarbons

H) Monoesters, for example butyl oleate, phenoxyethyl oleate, tetrahydrofurfuryl oleate and esters of alkylsulfonic acids.

I) Glycol esters, for example diglycol benzoates.

Definitions and examples of plasticisers from groups F) to I) are given in the following handbooks:

"Plastics Additives Handbook", Editors H. Gächter and H. Müller, Hanser Publishers, 1985, page 284, chapter 5.7.11 (Group F)) and chapter 5.7.13 (Group G)).

"PVC Technology", Editor W. V. Titow, 4th Ed., Elsevier Publishers, 1984, pages 173, 171–173, chapter 6.10.2 (Group F)), page 174, chapter 6.10.5 (group G)), page 173, chapter 6.10.3 (group H)) and pages 173–174, chapter 6.10.4 (group I)).

Particular preference is given to plasticisers from group A) to E) in particular A) to C), especially the plasticisers in these groups which have been found to be preferred. Di-2-ethylhexyl phthalate (DOP) is particularly favourable.

The plasticisers can be used in an amount of, for example, from 15 to 70 parts by weight, expediently from 15 to 60 parts by weight, in particular from 20 to 50 parts by weight, based on 100 parts by weight of polymer composition.

The polymer compositions of the present invention may also contain further stabilisers, for example the abovementioned component d) 1,3-diketones, which can expediently be used in amounts of from 0.05 to 5 parts by weight, preferably in amounts of from 0.10 to 1 part by weight and in particular in amounts of from 0.5 to 1 part by weight, in each case based on 100 parts by weight of composition.

Another stabiliser which may likewise be used is the above-described component e)—the organic or inorganic calcium compounds—which can expediently be used in amounts of from 0.05 to 5 parts by weight, preferably in amounts of from 0.1 to 1 part by weight and in particular in amounts of from 0.5 to 1 part by weight, in each case based on 100 parts by weight of composition.

If further stabilisers from the series consisting of the organic and inorganic calcium, barium, magnesium and lead compounds, as mentioned above, are used, it is possible to use, for example, from 0 to 5 parts by weight, based on the composition. From 0.05 to 5 parts by weight, preferably from 0.1 to 1 part by weight, are expedient.

The compositions according to the invention may also contain further stabilisers which are conventional for chlorine-containing thermoplastics. Thus, they contain, for example, 0–3 parts, in particular 0–1.5 parts, especially 0–1 part, based on the composition, of one or more phosphites. Such phosphites can be used, for example, in an amount of 0.01–3 parts, in particular 0.01–1.5 parts, for example 0.01–1 part, preferably 0.1–0.6 part, for example 0.2–0.5 part. Examples of such phosphites are, for example, those of the formulae

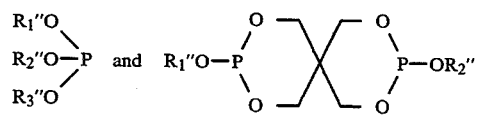

in which $R^{1\prime\prime}$, $R^{2\prime\prime}$ and $R^{3\prime\prime}$ are identical or different and are $C_6$–$C_{18}$alkyl, $C_6$–$C_{18}$alkenyl, substituted or unsubstituted phenyl or $C_5$–$C_7$cycloalkyl.

$C_6$–$C_{18}$alkyl $R^{1\prime\prime}$, $R^{2\prime\prime}$ and $R^{3\prime\prime}$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R^{1\prime\prime}$, $R^{2\prime\prime}$ and $R^{3\prime\prime}$ are, for example, tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, 2,4-di-tert-butylphenyl didodecyl, 2,6-di-tert-butylphenyl didodecyl phosphites and dialkyl and diaryl pentaerythrityl diphosphites, such as distearyl pentaerythrityl diphosphite.

Preferred organic phosphites are distearyl pentaerythrityl diphosphite, trisnonylphenyl phosphite and phenyl didecyl phosphite.

The compositions according to the invention may furthermore contain further known costabilisers, for example 0–2 parts, in particular 0–1.5 parts, based on the composition. They are then preferably present in an amount of 0.01–2 parts, in particular 0.05–1.5 parts, for example 0.1–1 part, especially 0.1–0.5 part. Examples of these costabilisers which may be mentioned are aminocrotonic esters, dehydracetic acid, 2,4-dihydroxybenzophenone, 2,4-dihydroxy-4'-tert-butylbenzophenone, dihydropyridine derivatives and pyrrole derivatives.

Suitable aminocrotonic esters are, in particular, the esters with monohydric, straight-chain $C_8$–$C_{20}$-, in particular $C_{12}$–$C_{18}$ alcohols, and/or with 1,3- or 1,4-butanediols and/or 1,2-dipropylene glycol and/or thiodiethylene glycol.

Pyrrole costabilisers which may be mentioned in particular are those described in EP-A 22 087 and GB-A 2 078 761, for example of the formula I given therein, preferably the pyrrole derivatives defined in claims 2–9 of EP-A 22 087. An example which may be mentioned is 2-methyl-3-cyclohexyloxycarbonyl-4-phenyl-1H-pyrrole.

The compositions according to the invention may furthermore contain, in addition to or instead of, the abovementioned optional costabilisers, further optional constituents, for example organoantimony compounds, such as antimony tris[isooctyl thioglycolate] (isooctyl=2-ethylhexyl).

Other stabilisers which may be used in the compositions according to the invention are polyols. The amounts to be used are, for example, up to 3 parts by weight, expediently up to 2 parts by weight and preferably from 0.01 to 1 part by weight, based on 100 parts by weight of composition. Typical examples of polyols are pentaerythritol, dipentaerythritol, trimethylolpropane, ditrimethylolpropane, tris(2-hydroxyethyl) isocyanurate (THEIC), the latter being preferred, sorbitol, mannitol and inositol.

The compositions according to the invention may furthermore contain conventional antioxidants, light stabilisers and UV absorbers. Examples of these are the following:

1. Antioxidants 1.1 Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol.

1.2. Alkylated hydroquinones, for example 2,6-di-tert-butyl-4-methoxyphenol, 2,5-di-tert-butylhydroquinone, 2,5-di-tert-amyl-hydroquinone, 2,6-diphenyl-4-octadecyloxyphenol.

1.3. Hydroxylated diphenyl thioethers for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol).

1.4. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)-butane, 2,6-bis(3-tert-butyl-5-methyl-2-hydroxybenzyl)-4-methylphenol, 1,1,3-tris(5-tert-butyl-4-hydroxy-2-methylphenyl)-butane, 1,1-bis(5-tert-butyl-4-hydroxy-2-methyl-phenyl)-3-n-dodecylmercaptobutane, ethylene glycol bis[3,3-bis-(3'-tert-butyl-4'-hydroxyphenyl) butyrate], bis(3-tert.butyl-4-hydroxy-5-methyl-phenyl)-dicyclopentadiene, bis[2-(3'-tert-butyl-2'-hydroxy-5'-methyl-benzyl)-6-tert-butyl-4-methyl-phenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithioterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl) isocyanurate.

1.6. Acylaminophenols, for example 4-hydroxylauranilide, 4-dydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of β-(3,5-di-tert-butyl4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tri(hydroxyethyl) isocyanurate, N,N'-bis(hydroxyethyl)oxalamide.

1.8. Esters of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxalamide.

1.9. Esters of β-(3,5-dicyclohexyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxalamide.

1.10. Amides of β-(3,5-di-tert-butyl-4-hydroxyphenyl)propionic acid, for example N,N'-bis(3,5-di-tert-butyl-4-hydroxyphenylpropionyl)hexamethylendiamine, N,N'-bis(3,5-di-tert-butyl-4-hydroxyphenylpropionyl)-trimethylendiamine, N,N'-bis(3,5-di-tert-butyl-4-hydroxyphenylpropionyl)-hydrazine.

2. UV Absorbers and light stabilisers 2.1. 2-(2'-Hydroxyphenyl)benzotriazols, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-secbutyl-5'-tert-butyl, 4'-octoxy, 3', 5'-di-tert-amyl and 3',5'-bis($\alpha,\alpha$-dimethylbenzyl) derivatives.

2.2. 2Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl and isooctyl $\alpha$-cyano-$\beta,\beta$-diphenylacrylate, methyl $\alpha$-carbomethoxycinnamate, methyl and butyl $\alpha$-cyano-$\beta$-methyl-p-methoxycinnamate, methyl $\alpha$-carbomethoxy-p-methoxycinnamate and N-($\beta$-carbomethoxy-$\beta$-cyanovinyl)-2-methylindoline.

2.5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

2.6. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5 -triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

Depending on the application, the compositions according to the invention may also contain further conventional additives, for example 3. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythrityl diphosphite, bis(2,4-di-tert-butylphenyl) pentaerythrityl diphosphite, tristearyl sorbityl triphosphite, tetrakis(2,4-di-tert-butylphenyl)-4,4'-biphenylene diphosphonite and 3,9-bis(2,4-di-tert-butylphenoxy)-2,4,8,10-tetraoxa-3,9-diphosphaspiro[5.5]undecane.

4. Peroxide-destroying compounds, for example esters of $\beta$-thiodipropionic acid, for example the lauryl, stearyl, myristyl and tridecyl esters, mercaptobenzimidazole, the zinc salt of 2-mercaptobenzimidazole, zinc dibutyldithiocarbamate, dioctadecyl disulfide and pentaerythrityl tetrakis($\beta$-dodecylmercapto)propionate.

5. Basic costabilisers, for example urea derivatives, thiourea derivatives, alkali metal and alkaline earth metal salts of higher fatty acids, for example magnesium stearate, sodium ricinoleate and potassium palmitate, and trishydroxyethyl isocyanurate.

6. Fillers and reinforcing agents, for example calcium carbonate, silicates, glass fibres, talc, kaolin, mica, barium sulfate, metal oxides and hydroxides, carbon black and graphite.

7. Other additives, for example plasticisers, lubricants, emulsifiers, pigments, optical brighteners, flameproofing agents, antistatics and blowing agents.

Examples of other particularly valuable costabilisers, one or more of which can be used in addition to or instead of the abovementioned optional costabilisers, are listed below by way of example, with the amount used being, for example, from 0 to 2.0 parts by weight, expediently from 0.05 to 1.0 parts by weight and in particular from 0.1 to 0.5 part by weight for each costabiliser, in each case based on 100 parts by weight of composition.

Stabiliser mixtures of a salt of an organic acid and a polyol, where the polyol is a synergistic mixture of ditrimethylolpropane in combination with a different polyol having 5 to 15 carbon atoms and 2 to 10 hydroxyl groups and having a melting point of not below 100° C. A comprehensive description, examples and preferences are given in European Patent 0 058 447.

Stabiliser mixtures essentially comprising nitrogen-free keto acids having at least 8 carbon atoms and a metal salt of an organic nitrogen-free monocarboxylic acid having 6 to 24 carbon atoms or the salts of ketoacetic acids having 4 to 33 carbon atoms and a hydrocarbon-substituted phenol. A detailed description of stabiliser mixtures of this type, examples and preferences are given in GB 1 099 731.

Stabiliser mixtures comprising 0.7–2 pans of thiodiethylene glycol bisacetoacetate of the formula $(H_3CCOCH_2COOCH_2CH_2)_2S$, 0–0.5 pan of at least one calcium, barium and/or magnesium salt of an aliphatic $C_8$–$C_{24}$ monocarboxylic acid or -hydroxymonocarboxylic acid or of benzoic acid or tert-butylbenzoic acid, 0.01–0.2 pan of at least one zinc salt of an aliphatic $C_8$–$C_{24}$ monocarboxylic acid or -hydroxymonocarboxylic acid or of benzoic acid or tert-butylbenzoic acid, these mixtures being further mixed with 3–10 pans of epoxidised, unsaturated fatty acid esters and 10–70 pans of at least one organic plasticiser. A detailed description, examples and preferences are given in GB 2 212 808.

Stabiliser mixtures comprising 0.7–2 pans of thiodiethylene glycol bisacetoacetate of the formula $(H_3CCOCH_2COOCH_2CH_2)_2S$, 0–0.5 pan of a calcium, barium and/or magnesium salt of an aliphatic $C_8$–$C_{24}$ monocarboxylic acid or -hydroxymonocarboxylic acid or of benzoic acid or tert-butylbenzoic acid, 0.01–0.2 pan of a zinc salt of an aliphatic $C_8$–$C_{24}$ monocarboxylic acid or -hydroxymonocarboxylic acid or of benzoic acid or tert-butylbenzoic acid, and additionally, 3-10 parts of epoxidised, unsaturated fatty acid esters. Further details, examples and preferences are given in GB 2 192 004.

Compounds of the formulae a and b

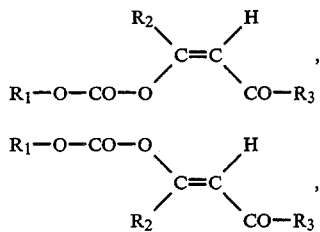

in which R¹ is $C_1$-$C_{22}$alkyl, phenyl, $C_1$-$_9$alkyl-monosubstituted or disubstituted phenyl, $C_5$-$C_7$cycloalkyl or a group of the formula A or B

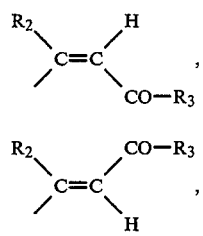

or R¹ is a group of the formula ca or cb

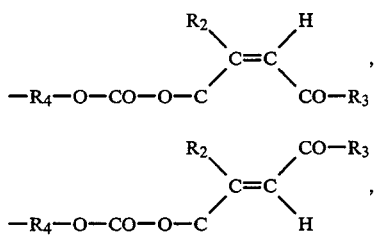

R² and R³, independently of one another are $C_1$-$C_{20}$alkyl, phenyl, $C_1$-$C_9$alkyl-monosubstituted or disubstituted phenyl or $C_5$-$C_7$cycloalkyl, and R⁴ is $C_2$-$C_{12}$alkylene. Further details, examples and preferences are given in EP 224 438.

Further stabilisers are triazoles of the formula

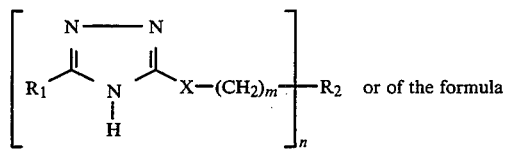  or of the formula

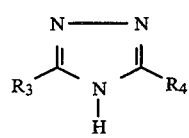

in which $R_1$ is hydrogen, hydroxyl, $C_1$-$C_6$alkoxycarboxyl, $C_2$-$C_6$alkoxycarbonyl, mercapto, $C_1$-$C_6$alkylthio or an —S—$CH_2$—COOH or —S—$CH_2$—COO—($C_1$-$C_6$)alkyl group, X is thio, methylene or the —COO— or —S—$CH_2$—COO—group, in each case bonded to the alkyl via the ester oxygen atom, m is an integer from 1 to 20, n is 1 or 2, $R_2$, if monovalent, is hydrogen, hydroxyl or mercapto and if bivalent is a direct bond, imino, $C_1$-$C_6$alkylimino, oxygen, sulfur or methylene, $R_3$ is hydrogen, amino, mercapto or $C_1$-$C_{12}$alkylthio, and if $R_3$ is hydrogen, $R_4$ is hydrogen, —$COOR_5$ in which $R_5$ is hydrogen, $C_1$-$C_8$alkyl or —$CH_2$—COO—($C_1$-$C_8$)alkyl, or —S—$R_6$ where $R_6$ is hydrogen, $C_1$-$C_{12}$alkyl , —$CH_2$—COO—($C_1$-$C_8$)alkyl or $C_1$-$C_{12}$alkylthio or is

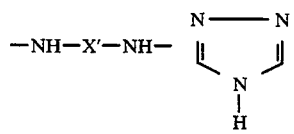

in which X' is —CO—NH-alkylene—NH—CO—, —CO-alkylene-S-alkylene—CO—, each having 1-12 carbon atoms in the alkylene chain, or ($C_1$-$C_{12}$)alkylene, if $R_3$ is $NH_2$, $R_4$ is $C_1$-$C_4$alkyl, mercapto, $C_1$-$C_4$alkylthio or

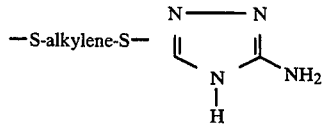

having 1-12 carbon atoms in the alkylene chain, if $R_3$ is mercapto, $R_4$ is unsubstituted or substituted phenyl, and if $R_3$ is $C_1$-$C_{12}$alkylthio, $R_4$ is $C_1$-$C_4$alkyl, $C_1$-$C_{12}$alkylthio, or unsubstituted or substituted phenyl.

Stabilisers of this type, further embodiments, examples and preferences are given in DE 3 048 659.

Stabiliser mixtures comprising a thioether of the formula

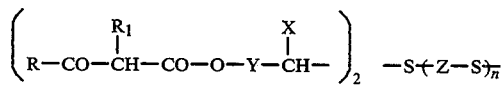

in which n is the number zero or 1,

R is $C_1$-$C_{18}$alkyl, $C_5$-$C_8$cycloalkyl or $C_6$-$C_{10}$aryl which is unsubstituted or substituted by $C_1$-$C_4$alkyl, and R is hydrogen or $C_1$-$C_4$alkyl, X, as a recurring symbol, is identical or different and is hydrogen or a group of the formula

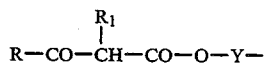

Y, as a recurring symbol, is identical or different and is $C_1$-$C_6$alkylene or a group of the formula

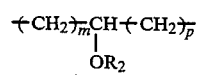

where the $+CH_2\overline{)_m}$ group is bonded to the oxygen atom and in which $R_2$ is hydrogen or a group of the formula

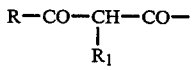

n is a number from 1 to 4 and p is a number from 0 to 3, Z is $C_1$–$C_6$alkylene or a group of the formula

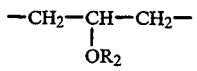

and b) a stabiliser containing a metal from the group consisting of zinc, calcium, barium, magnesium and antimony or furthermore zinc combined with at least one of the abovementioned metals.

Further details, examples and preferences are given in EP 19 576.

In addition to said stabilisers and costabilisers of this invention, it is also possible to use epoxy compounds, such as 1,2-epoxides and oxiranes, in amounts of, for example, up to 10 parts by weight, expediently up to 5 parts by weight and preferably from 0.01 to 2 parts by weight, based on 100 parts by weight of the composition. Examples of these compounds are epoxidised polybutadiene, epoxidised soyabean oil, epoxidised linseed oil, epoxidised fish oil, epoxidised tallow, methylbutyl or 2-ethylhexyl epoxystearate, tris(epoxypropyl) isocyanurate, epoxidised castor oil, epoxidised sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl 3,4-epoxycyclohexanecarboxylate.

The compositions according to the invention can be prepared in a manner known per se. In general, the stabiliser system is incorporated into the polymer using equipment known per se, such as calenders, mixers, compounders and the like.

The compositions stabilised in accordance with the present invention can be converted into the desired shape in a known manner. Methods of this type are, for example, grinding, calendering, extrusion, injection moulding, sintering and spinning, furthermore extrusion blow moulding or conversion by the plastisol process. The compositions can also be converted into foams.

Preferred stabilised chlorine-containing polymer compositions are unplasticised or plasficiser-free or essentially plasticiser-free compositions.

The compositions according to the invention are particularly suitable, in the form of rigid recipes, for hollow articles (bottles), packaging films (thermoformed films), blown films, crash-pad films (automobiles), tubes, foams, heavy profiles (window frames), light-wall profiles, building profiles, sidings, fittings, office films and equipment housings (computers and domestic appliances).

Other compositions, in the form of flexible recipes, are wire sheaths, cable insulations, decorative films, roof sheeting, foams, agricultural sheeting, tubes, sealing profiles, office films and sheeting for inflated tents.

Examples of the use of the compositions according to the invention as plastisols are artificial leather, flooring, textile coatings, wallcoverings, coil coatings and automotive underseal.

Examples of sintered PVC applications of the compositions according to the invention are slush, slush mould and coil coatings.

The above-described polymer compositions are preferably used as rigid profiles for external applications and as rigid films. Further preferred uses of the above-described polymer compositions are in slush moulding or as crash pads.

The examples below illustrate the invention in greater detail. Parts and percentages are by weight, unless stated otherwise.

EXAMPLE 1

Various PVC compositions are prepared by mixing the individual components in accordance with the table below (amounts in parts by weight).

TABLE 1

| | | | | |
|---|---|---|---|---|
| Solvic 264 GA (S-PVC; K value 64) | 100 | 100 | 100 | 100 |
| Amine 1 | 1.2 | 1.2 | 0.3 | 0.3 |
| Zinc neodecanoate | 1.4 | 1.4 | 0.5 | 0.5 |
| Wessalith P (NaA zeolite) | — | 0.5 | — | 2.5 |
| Induction time in the DHC test* [min] | 54 | 62 | 23 | 43 |

*DHC test: Dehydrochlorination test in accordance with DIN 53 381, Part 3 [Induction time: Time until the dehydrochlorination curve rises]

These are formulations for rigid PVC profiles for external applications. The compositions are subjected to a heat test in order to test the effect of the stabiliser in PVC.

The sterically hindered amine mentioned in the example is the following compound:

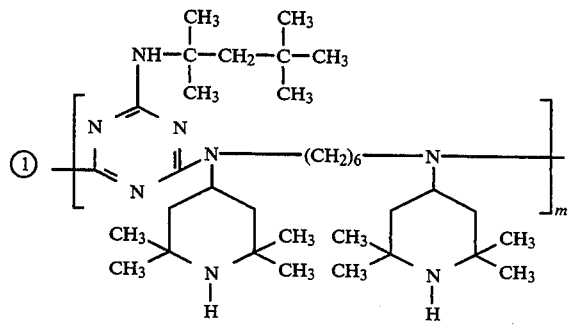

$M_{mean} = 2500$; m = 2–200

What is claimed is:

1. A stabilised, chlorine-containing polymer composition comprising a chlorine-containing polymer derived from at least one ethylenically unsaturated monomer and a stabiliser mixture comprising:
   a) at least one cyclic or noncyclic, sterically hindered piperidine amine,
   b) at least one organic zinc compound and/or inorganic zinc compound from the series consisting of the carbonates, chlorides, sulfates, oxides, hydroxides, basic oxides and mixed oxides, and
   c) at least one compound from the series consisting of the crystalline alkali metal/alkaline earth metal alumosilicates.

2. A polymer composition according to claim 1, containing d) at least one 1,3-diketone.

3. A polymer composition according to claim 1, containing e) at least one organic or inorganic calcium compound.

4. A polymer composition according to claim 1, wherein a) is at least one cyclic, sterically hindered amine.

5. A polymer composition according to claim 1, wherein a) is, a compound from the series consisting of polyalkylpiperidine derivatives containing at least one group of the formula III

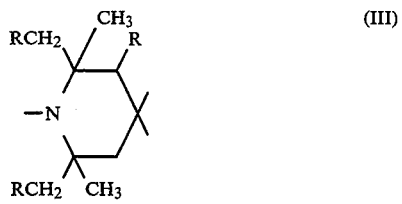

in which R is hydrogen or methyl.

6. A polymer composition according to claim 1, wherein a) is, a compound from the series consisting of polyalkylpiperidine derivatives containing at least one group of the formula III

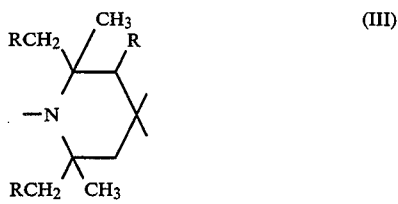

in which R is hydrogen or methyl, and in which the polyalkylpiperidine radical of the formula III is 4-substituted by one or 2 polar substituents or by one polar spiro ring system.

7. A polymer composition according to claim 1, wherein b) is at least one organic zinc compound from the series consisting of the aliphatic saturated $C_2$–$C_{22}$carboxylates, aliphatic olefinic $C_3$–$C_{22}$carboxylates, aliphatic $C_2$–$C_{22}$carboxylates, which are substituted by at least one OH group, cyclic and bicyclic carboxylates having 5–22 carbon atoms, aromatic $C_7$–$C_{22}$carboxylates, aromatic $C_7$–$C_{22}$carboxylates which are substituted by at least one OH group, $C_1$–$C_{16}$alkyl-substituted phenyl carboxylates, phenyl-$C_1$–$C_{16}$alkyl carboxylates, $C_6$–$C_{18}$phenolates, $C_5$–$C_{26}$chelates of 1,3-diketones or β-ketocarboxylic esters or dehydracetic acid derivatives, and mercaptides based on mercaptocarboxylic esters and glycinates.

8. A polymer composition according to claim 1, wherein c) is at least one compound from the series consisting of NaA zeolites.

9. A polymer composition according to claim 1, wherein c) is $Na_{12}Al_{12}Si_{12}O_{48} \cdot 27\,H_2O$.

10. A polymer composition according to claim 1, containing d) at least one 1,3-diketone of the general formula II or IIa,

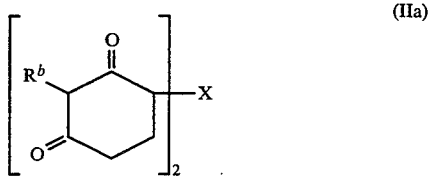

where $R^a$ is alkyl having 1 to 22 carbon atoms, $C_5$–$C_{10}$hydroxyalkyl, alkenyl having 2 to 22 carbon atoms, phenyl, phenyl which is substituted by —OH, $C_1$–$C_4$alkyl, $C_1$–$C_4$alkoxy or halogen, or is phenyl-$C_1$–$C_4$alkyl, a group of the formula

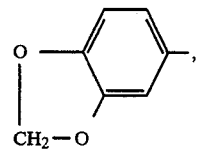

cycloalkyl having 5 to 12 ring carbon atoms, or cycloalkyl having 5 to 12 ring carbon atoms which is substituted by 1 to 3 $C_1$–$C_4$alkyl groups, $R^c$ is alkyl having 1 to 22 carbon atoms, $C_5$–$C_{10}$hydroxyalkyl, alkenyl having 2 to 22 carbon atoms, phenyl, phenyl which is substituted by —OH, $C_1$–$C_4$alkyl, $C_1$–$C_4$alkoxy or halogen, or is phenyl-$C_1$–$C_4$alkyl, a group of the formula

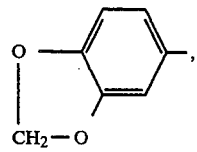

cycloalkyl having 5 to 12 ring carbon atoms, or cycloalkyl having 5 to 12 ring carbon atoms which is substituted by 1 to 3 $C_1$–$C_4$alkyl groups, $R^b$ is —H, alkyl having 1 to 8 carbon atoms, alkenyl having 2 to 12 carbon atoms, phenyl, $C_1$–$C_4$alkyl-substituted phenyl, phenyl-$C_1$–$C_4$alkyl or a group of the formula

where $R^d$ is —$CH_3$, —$C_2H_5$ or phenyl, or in which $R^a$ and $R^b$ together are a tetramethylene radical or a tetramethylene radical which is fused to a benzene radical, and X is alkylene having 1–4 carbon atoms.

11. A polymer composition according to claim 1, containing d) at least one 1,3-(diketone of the general formula IIb

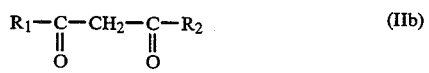

in which $R_1$ is $C_1$–$C_{10}$alkyl, $C_5$–$C_{10}$hydroxyalkyl, phenyl, hydroxyphenyl, $C_7$–$C_{10}$phenylalkyl or $C_7$–$C_{10}$phenylalkyl which is substituted on the phenyl ring by an OH group, and $R_2$ is $C_5$–$C_{10}$hydroxyalkyl, hydroxyphenyl or $C_7$–$C_{10}$phenylalkyl which is substituted on the phenyl ring by an OH group, with the proviso that $R_2$ is not hydroxyphenyl if $R_1$ is phenyl or hydroxyphenyl.

12. A polymer composition according to claim 1, containing e) at least one calcium soap of the general formula Ca—(OOCR$^x$)$_2$, where $R^x$ is an alkyl group having 1 to 22 carbon atoms, an alkenyl group having 2 to 22 carbon atoms, phenyl, phenyl-$C_1$-$C_4$alkyl or $C_1$-$C_8$alkylphenyl.

13. A polymer composition according to claim 1, wherein a) is a derivative of 2,2,6,6-tetramethylpiperidine.

14. A polymer composition according to claim 1, wherein a) is a compound of the formula VIII

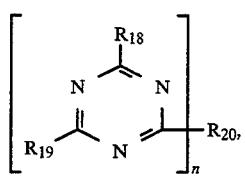

(VIII)

in which n is the number 1 or 2, and $R^{18}$ is a group of the formula

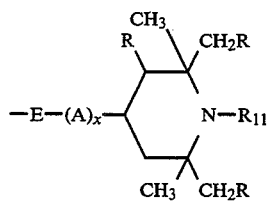

in which R is hydrogen or methyl, $R^{11}$ is hydrogen, oxyl, hydroxyl, $C_1$-$C_{12}$alkyl, $C_3$-$C_8$alkenyl, $C_3$-$C_8$alkynyl, $C_7$-$C_{12}$aralkyl, $C_1$-$C_{18}$alkoxy, $C_5$-$C_8$cycloalkoxy, $C_7$-$C_9$phenylalkoxy, $C_1$-$C_8$alkanoyl, $C_3$-$C_5$alkenoyl, $C_1$-$C_{18}$alkanoyloxy, benzyloxy, glycidyl or a —$CH_2$CH(OH)—Z group, in which Z is hydrogen, methyl or phenyl, E is —O— or —$NR^{11}$—, A is $C_2$-$C_6$alkylene or —(CH_2)_3—O—, and x is the number 0 or 1, $R^{19}$ is identical to $R^{18}$ or is one of the groups —$NR^{21}R^{22}$, —$OR^{23}$, —$NHCH_2OR^{23}$ or —$N(CH_2OR^{23})_2$, $R^{20}$, if n=1, is identical to $R^{18}$ or $R^{19}$ and, if n=2, is a —E—B—E— group, in which B is $C_2$-$C_6$alkylene, which may be interrupted by —$N(R^{21})$—, $R^{21}$ is $C_1$-$C_{12}$alkyl, cyclohexyl, benzyl or $C_1$-$C_4$hydroxyalkyl or a group of the formula

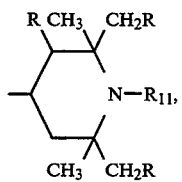

$R^{22}$ is $C_1$-$C_{12}$alkyl, cyclohexyl, benzyl or $C_1$-$C_4$hydroxyalkyl, and $R^{23}$ is hydrogen, $C_1$-$C_{12}$alkyl or phenyl, or $R^{21}$ and $R^{22}$ together are $C_4$-$C_5$alkylene or -oxaalkylene, for example

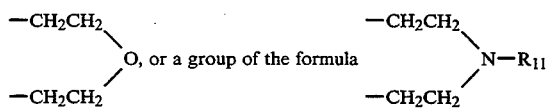

or alternatively $R^{21}$ and $R^{22}$ are each a group of the formula

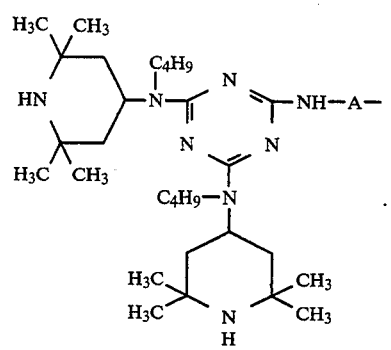

15. A polymer composition according to claim 1, wherein a) is one of the compounds of the formulae

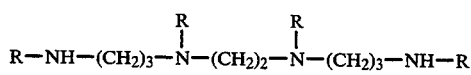

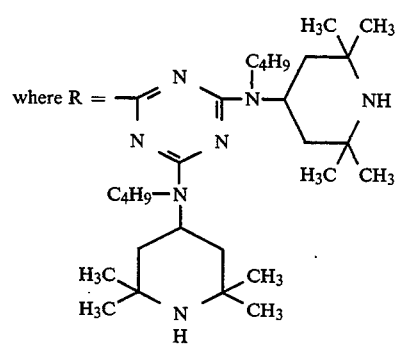

and

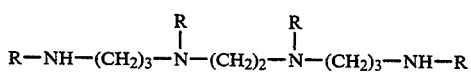

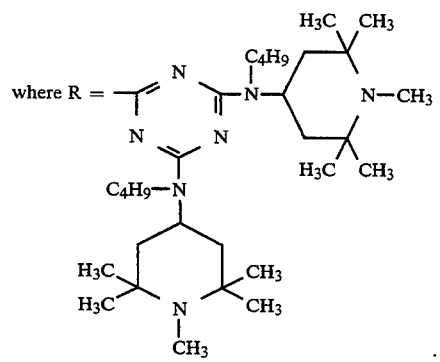

16. A polymer composition according to claim 1, wherein a) is an oligomeric or polymeric compound from the series consisting of the polyesters, polyethers, polyamides, polyamines, polyurethanes, polyureas, polyaminotriazines, poly(meth)acrylates, poly(meth)acrylamides, and copolymers thereof whose recurring structural unit contains a 2,2,6,6-tetramethylpiperidine radical of the formula III

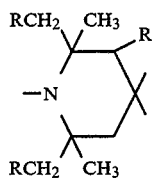

is which R is hydrogen or methyl.

17. A polymer composition according to claim 1, wherein a) is a compound of the formula

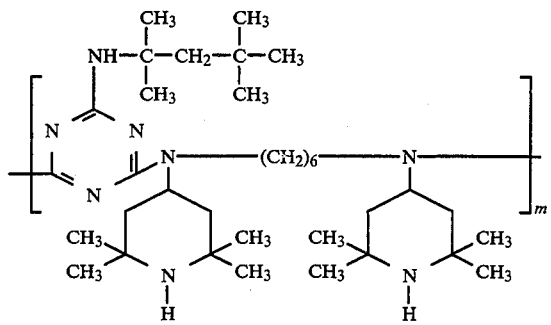

in which m is a number from 2 to 200.

18. A polymer composition according to claim 1, wherein b) is an organic zinc compound, where the organic zinc compound is a salt of a carboxylic acid having 7 to 20 carbon atoms or a $C_7$–$C_{20}$alkylphenolate.

19. A polymer composition according to claim 1, comprising, based on the composition,
  a) from 0.01 to 1.5 parts by weight of cyclic or noncyclic, sterically hindered amines,
  b) from 0.01 to 2 parts by weight of an organic or inorganic zinc compound, and
  c) from 0.1 to 3 parts by weight of compounds from the series consisting of the crystalline alkali metal-/alkaline earth metal alumosilicates.

20. A polymer composition according to claim 1, containing
  d) from 0.05 to 5 parts by weight of a 1,3-diketone.

21. A polymer composition according to claim 1, containing
  e) from 0.05 to 5 parts by weight of an organic or inorganic calcium compound.

22. A polymer composition according to claim 1, in which the polymer is or contains polyvinyl chloride.

23. A polymer composition according to claim 1 wherein the chlorine-containing polymer is a rigid profile for external applications or a rigid film or sheeting.

24. A polymer composition according to claim 1 wherein the chlorine-containing polymer is for slush moulding or for crash pads.

* * * * *